(12) United States Patent
Yoo

(10) Patent No.: US 9,009,835 B2
(45) Date of Patent: Apr. 14, 2015

(54) SMART CARD, ANTI-VIRUS SYSTEM AND SCANNING METHOD USING THE SAME

(75) Inventor: InSeon Yoo, Osan-Si (KR)

(73) Assignee: Samsung SDS Co., Ltd., Seoul (KR)

( * ) Notice: Subject to any disclaimer, the term of this patent is extended or adjusted under 35 U.S.C. 154(b) by 175 days.

(21) Appl. No.: 13/198,878

(22) Filed: Aug. 5, 2011

(65) Prior Publication Data

US 2012/0036571 A1 Feb. 9, 2012

(30) Foreign Application Priority Data

Aug. 6, 2010 (KR) .................. 10-2010-0076094

(51) Int. Cl.
*G06F 21/00* (2013.01)
*G06F 21/56* (2013.01)

(52) U.S. Cl.
CPC .................................. *G06F 21/567* (2013.01)

(58) Field of Classification Search
USPC ................. 726/22–25, 9, 20; 713/187–188; 709/217–229
See application file for complete search history.

(56) References Cited

U.S. PATENT DOCUMENTS

| | | | |
|---|---|---|---|
| 6,006,329 A * | 12/1999 | Chi | 726/24 |
| 6,170,007 B1 | 1/2001 | Venkatraman et al. | |
| 6,604,143 B1 | 8/2003 | Nagar et al. | |
| 6,944,650 B1 | 9/2005 | Urien | |
| 6,980,992 B1 * | 12/2005 | Hursey et al. | 1/1 |
| 7,831,606 B2 * | 11/2010 | Pandya | 707/758 |
| 2002/0040936 A1 | 4/2002 | Wentker et al. | |
| 2003/0070087 A1 * | 4/2003 | Gryaznov | 713/201 |
| 2004/0210769 A1 | 10/2004 | Radatti et al. | |
| 2005/0176415 A1 * | 8/2005 | Jang et al. | 455/418 |
| 2006/0123480 A1 * | 6/2006 | Oh et al. | 726/23 |
| 2006/0259819 A1 | 11/2006 | Connor | |
| 2006/0294249 A1 | 12/2006 | Oshima et al. | |
| 2007/0180529 A1 * | 8/2007 | Costea et al. | 726/24 |
| 2007/0294744 A1 * | 12/2007 | Alessio et al. | 726/1 |
| 2008/0005796 A1 * | 1/2008 | Godwood et al. | 726/24 |
| 2008/0184372 A1 * | 7/2008 | Hoshina | 726/24 |
| 2008/0280644 A1 * | 11/2008 | Hugot | 455/556.2 |
| 2008/0282351 A1 | 11/2008 | Khilnani et al. | |
| 2009/0083727 A1 | 3/2009 | Fu et al. | |
| 2009/0113540 A1 * | 4/2009 | Chandwani | 726/13 |
| 2010/0050261 A1 * | 2/2010 | Park | 726/24 |
| 2010/0154062 A1 * | 6/2010 | Baram et al. | 726/24 |

FOREIGN PATENT DOCUMENTS

| | | |
|---|---|---|
| EP | 1056010 A1 | 11/2000 |
| EP | 1724701 A2 | 11/2006 |
| JP | 10149270 A | 6/1998 |
| JP | 2002132454 A | 5/2002 |
| JP | 2002539546 A | 11/2002 |

(Continued)

OTHER PUBLICATIONS

A Malware Signature Extraction and Detection Method Applied to Mobile Networks by Hu et al; Publisher: IEEE; Year: 2007.*

(Continued)

*Primary Examiner* — Madhuri Herzog
(74) *Attorney, Agent, or Firm* — Sughrue Mion, PLLC

(57) ABSTRACT

A smart card installed in a device receives from the device data to be scanned and determines whether a virus exists in the data. Accordingly, security of the device may be enhanced without using substantial resources of the device.

44 Claims, 19 Drawing Sheets

(56) References Cited

FOREIGN PATENT DOCUMENTS

| JP | 2007151114 A | 6/2007 |
|---|---|---|
| JP | 2008293150 A | 12/2008 |
| JP | 2009134740 A | 6/2009 |
| JP | 2010527075 A | 8/2010 |
| WO | 93/25024 A1 | 12/1993 |
| WO | 2007026423 A1 | 3/2007 |
| WO | WO 2007062673 A1 | 6/2007 |
| WO | WO 2007107868 A2 | 9/2007 |

OTHER PUBLICATIONS

Communication dated Nov. 8, 2011 from the European Patent Office in counterpart European application No. 11176640.8.

Hidetoshi, Tateyama; Protecting a Virus Threatening a Personal Computer Using a Free Software AVG, ASCII dot PC, ASCII Corporation; Dec. 1, 2007; vol. II; Edition 12; p. 112-114.

TTS, Solving a Doubt, A Prescription for Security, PC Japan, Softbank Creative Corporation, Apr. 1, 2009, vol. 14, Edition 4, p. 128.

Trend Micro, Announcing a USB Memory Type Virus Scanning and Exterminating Tool, Trend Micro Portable Security, Embedded Press, Technical Evaluation Corporation, vol. 19.

Communication, dated Mar. 26, 2013, issued by the Japanese Patent Office in counterpart Japanese Application No. 2011-171790.

Various: "Firewall", Wikipedia, Jul. 30, 2010, Retrieved from the Internet.

Communication dated Feb. 7, 2012, issued by the European Patent Office in counterpart European Application No. 11176640.8.

Communication dated Dec. 16, 2013, issued by the European Patent Office in counterpart European Patent Application No. 11176640.8.

\* cited by examiner

SMART CARD, ANTI-VIRUS SYSTEM AND SCANNING METHOD USING THE SAME

CROSS-REFERENCE TO RELATED PATENT APPLICATION

This application claims priority from Korean Patent Application No. 10-2010-0076094, filed on Aug. 6, 2010, in the Korean Intellectual Property Office, the disclosure of which is incorporated herein by reference in its entirety.

BACKGROUND

1. Field

One or more aspects of the exemplary embodiments relate to smart cards, anti-virus systems, and scanning methods, which reinforce security of a device without using resources of the device.

2. Description of the Related Art

Smart cards are mainly installed and used in mobile devices. As technologies have been developed, smart cards have been widely used in various fields. In particular, a smart card is installed in a mobile device such as a cellular phone, a personal digital assistant (PDA) or a smart phone, and supports a function, such as financial transaction. Recently, since applications that are downloaded from a server through a network, such as application (App) store, have been increasingly installed and used in mobile devices, mobile devices are likely to be exposed to malware, such as a virus.

Mobile devices in which smart cards are installed support various functions, such as voice phone calls, video phone calls, cameras, recorders, MP3 players, financial transactions, and stock trading, and thus mobile devices require many resources, such as memory resources and processing resources.

Thus, there is a need for a method of reinforcing security of a device, while not affecting the resources of the devices.

SUMMARY

One or more aspects of the exemplary embodiments provide smart cards, anti-virus systems, and scanning methods, for reinforcing security of a device.

One or more aspects of the exemplary embodiments also provide smart cards, anti-virus systems, and scanning methods, which reinforce security of a device without using substantial resources of the device.

According to an aspect of the exemplary embodiments, there is provided a smart card including an interface unit that receives from a device in which the smart card is installed data to be scanned; and an anti-virus engine that scans the data received by the interface unit and determines whether a virus exists in the scanned data.

According to another aspect of the exemplary embodiments, there is provided a smart card-based anti-virus system including a device having data to be scanned; and a smart card installed in the device that receives from the device the data to be scanned scans the received data to be scanned, and determines whether a virus exists in the scanned data.

According to another aspect of the exemplary embodiments, there is provided a method of scanning data for a virus, the virus scanning method including receiving, by a smart card, from a device in which the smart card is installed data to be scanned, scanning, by the smart card, the received data to be scanned for a virus, and determining, by the smart card, whether the virus exists in the scanned data based on a result of the scanning.

According to another aspect of the exemplary embodiments, there is provided a smart card including an anti-virus engine that compares data to be scanned, received from a device in which the smart card is installed, to a virus signature and determining whether virus exists in the scanned data based on a result of the comparing; and a first anti-virus application that updates the virus signature.

BRIEF DESCRIPTION OF THE DRAWINGS

The above and other aspects will become more apparent by describing in detail exemplary embodiments thereof with reference to the attached drawings in which.

DETAILED DESCRIPTION OF THE EXEMPLARY EMBODIMENTS

Figure 1:
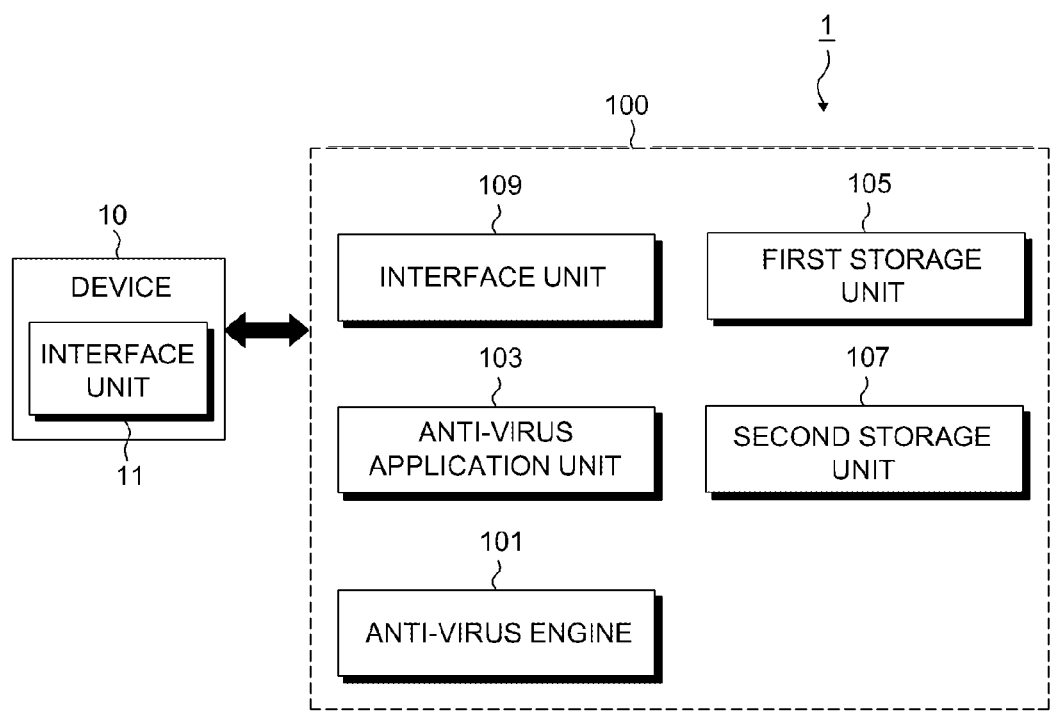
FIG. 1 is a functional block diagram of a smart card-based anti-virus system according to an exemplary embodiment.

Exemplary embodiments will now be described more fully with reference to the accompanying drawings to clarify aspects, features and advantages of the disclosure. The exemplary embodiments may, however, be embodied in many different forms and should not be construed as limited to the exemplary embodiments set forth herein. Rather, these exemplary embodiments are provided so that this disclosure will be thorough and complete, and will fully convey the scope of the disclosure to those of ordinary skill in the art. It will be understood that when an element, layer or region is referred to as being "on" another element, layer or region, the element, layer or region can be directly on another element, layer or region or intervening elements, layers or regions.

The terms used herein are for the purpose of describing particular exemplary embodiments only and are not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, layers, regions, elements, components, and/or groups thereof, but do not preclude the presence or addition of one or more other features, integers, steps, operations, layers, regions, elements, components, and/or groups thereof. As used herein, the term "and/or" includes any and all combinations of one or more of the associated listed items.

As the exemplary embodiments allow for various changes, particular exemplary embodiments will be illustrated in the drawings and described in detail in the written description. However, this is not intended to limit the disclosure to particular modes of practice, and it is to be appreciated that all changes, equivalents, and substitutes that do not depart from the spirit and technical scope of the disclosure are encompassed. In the description, certain detailed explanations of related art are omitted when it is deemed that they may unnecessarily obscure the essence of the disclosure.

FIG. 1 is a functional block diagram of a smart card-based anti-virus system according to an exemplary embodiment.

Referring to FIG. 1, the smart card-based anti-virus system 1 according to the present exemplary embodiment may include a device 10, and a smart card 100 that communicates with the device 10 according to predetermined communication protocol. The predetermined communication protocol may be, for example, at least one of International Standardization Organization (ISO) protocol, Universal Serial Bus (USB) protocol, and Secure Digital (SD) Card protocol.

An interface unit 11 of the device 10 and an interface unit 109 of the smart card 100 may support at least one of the ISO protocol, the USB protocol, and the SD protocol. The ISO protocol, the USB protocol, and the SD protocol are merely exemplary, and other protocols may be substituted without departing from the spirit and scope of the disclosure.

The smart card 100 is installed in the device 10, which may be a mobile device such as a cellular phone, a personal digital assistant (PDA), or a smart phone. In this case, the device 10 may store data to be scanned for malware, such as a virus. When the smart card 100 requests the data to be scanned, the device 10 may transmit the data to be scanned to the smart card 100, receive a scanning result from the smart card 100, and provide the scanning result to a user of the device 10.

Alternatively, the device 10 may periodically, or in response to a command, transmit the data to be scanned to the smart card 100 without any request of the smart card 100. For example, when the smart card 100 is installed in the device 10, and the device 10 communicates with the smart card 100, the device 10 may automatically transmit the data to be scanned to the smart card 100.

The smart card 100 may perform a scanning operation on the data transmitted from the device 10, and may transmit the scanning result to the device 10.

The smart card 100 may include an anti-virus engine 101 (which will be described below in detail) for performing the scanning operation on the data to be scanned, and at least one anti-virus application unit 103 required to perform an anti-virus scanning operation.

The smart card 100 may be, for example, a device that includes a microprocessor or central processing unit (hereinafter, referred to as a processor) and is detachable from a mobile device, may perform a security-related operation, such as an operation of storing data, encrypting data, and authenticating data, and may include at least one of network authentication applications, such as subscriber identification module (SIM), a user identification module (UIM), and a removable-user identification module(R-UIM). In addition, the smart card 100 may include a web server and/or a firewall engine (hereinafter, referred to as a firewall).

The anti-virus application unit 103 may include at least one application required to perform the anti-virus scanning operation. Throughout this specification, virus includes any malicious code that adversely affects an operation of a device 10, such as for example, a virus, malware, worm, trojan, or other malicious application.

The anti-virus application unit 103 may include an application for performing at least one of a function of providing to the device 10 a user interface for inputting information (hereinafter, referred to as anti-virus system setting information) required for an anti-virus system operation, a function of requesting the device 10 to transmit the data to be scanned in response to a command or according to a scanning schedule contained in the anti-virus system setting information, and a function of updating virus signature data that is stored in response to a command or according to an update schedule contained in setting information.

The anti-virus system setting information may be information regarding a scanning schedule of the anti-virus engine 101, a scanning directory in which the data to be scanned is stored, a file to be scanned, an update schedule, and/or an operation mode. The above-described information is exemplary, and thus the anti-virus system setting information may include any information required to perform an operations of the anti-virus system.

Alternatively, the anti-virus application unit 103 may include a plurality of applications for performing respective dedicated functions, such as an application for providing a user interface for inputting the anti-virus system setting information to the device 10, an application for requesting the device 10 to transmit the data to be scanned according to a scanning schedule contained in the anti-virus system setting information, and an application for updating virus signature data that is stored according to the update schedule included in the anti-virus system setting information. Throughout this specification, the application(s) for performing the anti-virus scanning operation will be referred to as anti-virus application(s). Hereinafter, an operation of the application will be described in detail.

According to an exemplary embodiment, the anti-virus application may provide a user interface for inputting the anti-virus system setting information to the device 10. This application (hereinafter, referred to as anti-virus application for user interface) may provide the user interface through the device 10 when a request for the anti-virus system setting information is transmitted from the device 10, or the smart card 100 is initialized. In this case, the user interface may provide an input unit that is embodied on a screen in order to input the scanning schedule of the anti-virus engine 101, the scanning directory in which the file to be scanned is stored, and at least one of the file to be scanned and the update schedule.

According to another exemplary embodiment, an anti-virus application for the user interface may be embodied to operate on a web server (not shown in FIG. 1) or may be embodied without any web server.

When the device 10 receives the anti-virus system setting information through the user interface provided by the anti-virus application for user interface, the device 10 may transmit the anti-virus system setting information to the smart card 100, and the anti-virus application for user interface may store the anti-virus system setting information in a predetermined storage unit. In FIG. 1, the anti-virus system setting information may be stored in a first storage unit 105.

According to an exemplary embodiment, an anti-virus application may read (refer to) the scanning schedule contained in anti-virus system setting information, and may obtain the data to be scanned according to the scanning schedule. For example, this application (hereinafter, referred to as anti-virus application for scanning data) may periodically or non periodically in response to a command request the device 10 to transmit the data to be scanned, and may store the data to be scanned in a predetermined storage unit according to the request. In FIG. 1, the data to be scanned may be stored in a second storage unit 107.

According to an exemplary embodiment, when the anti-virus application for scanning data request the data to be scanned, the data may include a scanning directory, and/or a name of a file to be scanned contained in the anti-virus system setting information. In addition, the device 10 may search for files contained in the scanning directory and/or files with a predetermined name, and may transmit the files to the smart card 100.

According to an exemplary embodiment, the anti-virus system setting information may further include information regarding an operation mode such as an automatic scanning operation mode and a manual scanning operation mode. If a user does not set any separate operation mode, the smart card 100 may default to any one of the operation modes.

For example, when the smart card 100 may default to the automatic scanning operation mode, the smart card-based anti-virus system may operate according to a scanning directory contained in the anti-virus system setting information, a name of a file to be scanned, a scanning schedule, and/or an update schedule, without any user's instruction.

When the smart card 100 may default to the manual scanning operation mode, the anti-virus application for user interface may provide a list and/or directory of a file to be scanned to the user. The user may select a scanning target in the list or directory of the file to be scanned and may execute a scanning operation. The anti-virus application unit 103 may further include an dedicated anti-virus application for providing the list or directory of the file to be scanned.

According to an exemplary embodiment, an anti-virus application may update virus signature data that is previously stored according to an update schedule contained in the anti-virus system setting information. For example, the anti-virus application (hereinafter, referred to as an update anti-virus application) requests a server (hereinafter, referred to as an update server) for periodically or non periodically storing virus signature data or the device 10 to transmit the virus signature data to be updated, and updates virus signature data that is stored by using data for update, which is received in response to the request.

According to an exemplary embodiment, the update anti-virus application may transmit data for update by using an over-the-air (OTA) method. According to another exemplary embodiment, the update anti-virus application may receive the data for update according to hypertext transfer protocol (HTTP) over a network. To this end, the update anti-virus application may request the update server to transmit the data for update according to HTTP.

According to an exemplary embodiment, an anti-virus application may provide a scanning result to the device 10. The anti-virus application may transmit a scanning result of the anti-virus engine 101 to the device 10, and the device 10 may provide the scanning result to a user. An application for providing the scanning result may be embodied as a separate dedicated application, or alternatively may be embodied as a part of the anti-virus application for user interface.

The above-described anti-virus applications may operate in communication with the device 10 directly, or alternatively, may operate on a web server, like in FIG. 2 or 3, which will be described below.

The smart card 100 may store anti-virus system setting information, user information, data to be scanned, and virus signature.

Referring to FIG. 1, the smart card 100 may include the first storage unit 105 for storing the anti-virus system setting information, and the second storage unit 107 for storing the user information, the data to be scanned and the virus signature. According to the present exemplary embodiment, the smart card-based anti-virus system includes two storage units, which is exemplary. That is, a single storage unit may be used, or the above-described information may be separately stored in three or more storage units, without departing from the spirit and scope of the disclosure.

The first storage unit 105 may be a NOR flash memory, and may support an European Telecommunications Standards institute (ETSI) file system. The second storage unit 107 may be a NAND flash memory. These storage units of the form of flash memory are exemplary, and may be another memory without departing from the spirit and scope of the disclosure.

The first storage unit 105 may receive the anti-virus system setting information from the device 10 according to an ISO protocol, a USB protocol, or a SD protocol, and may store the anti-virus system setting information. For example, the first storage unit 105 may receive the anti-virus system setting information in the form of an Application Protocol Data Unit (APDU).

The second storage unit 107 may receive user data according to, for example, the ISO protocol, the USB protocol, or the SD protocol. The user data may also be received in the form of APDU. In addition, the second storage unit 107 may receive and store the data to be scanned according to a mass storage command that is received from the device 10.

The second storage unit 107 may receive a virus signature by using an OTA method, and may store or update the virus signature. Alternatively, an application terminal of a mobile device may receive the virus signature through an interface unit according to the USB protocol and may store the virus signature.

According to the above-described embodiment, the second storage unit 107 stores the virus signature, but is not so limited. For example, an entire portion or a portion of the virus signature stored in the second storage unit 107 may be stored in another device, instead of the smart card 100. In addition, the smart card 100 may receive and use a necessary virus signature from the device only when an anti-virus system operates. In this case, the device may be the device 10 of FIG. 1, or may be a server that is connected directly or indirectly to the smart card 100.

According to an exemplary embodiment, a smart card-based anti-virus system may load data to be scanned, which is received from the device 10, to a memory and may scan the data to be scanned. Alternatively, the smart card-based anti-virus system may temporally store the data to be scanned, may load the data to be scanned to the memory, and may scan the data to be scanned.

For example, when the anti-virus engine 101 compares the data to be scanned and the virus signature and determines whether the data to be scanned contains virus, the anti-virus engine 101 may load data that is transmitted from the device 10 to a memory directly and may use the data, or may load the data to be scanned, which is temporally stored in a storage such as the second storage unit 10, to the memory and may use the data to be scanned.

The anti-virus engine 101 may communicate with the device 10 through an interface unit.

In addition, the anti-virus engine 101 may encrypt the virus signature and may store the virus signature in the second storage unit 107. When the anti-virus engine 101 performs a scanning operation, the anti-virus engine 101 may decrypt and use the virus signature.

Figure 2:
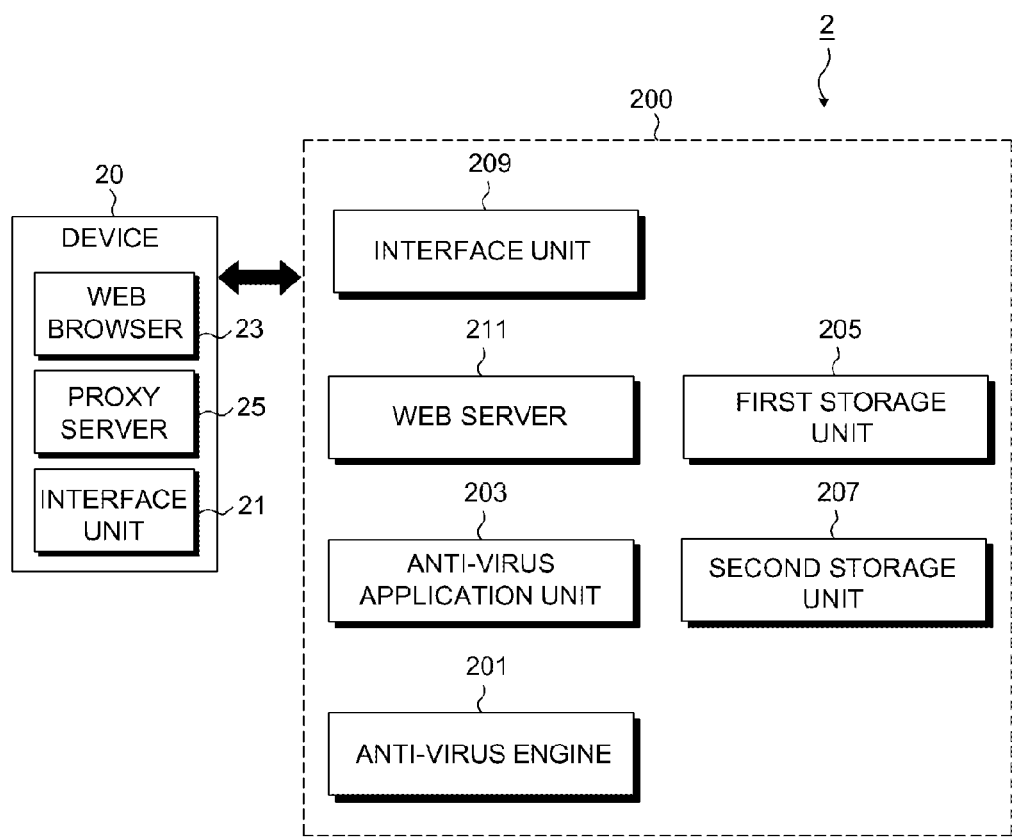
FIG. 2 is a functional block diagram of a smart card-based anti-virus system according to another exemplary embodiment.

FIG. 2 is a functional block diagram of a smart card-based anti-virus system according to another exemplary embodiment.

Referring to FIG. 2, the smart card-based anti-virus system 2 according to the present exemplary embodiment includes a device 20 and a smart card 200. According to the present embodiment, the device 20 includes an interface unit 21, a web browser 23, and a proxy server 25. The smart card 200 includes an anti-virus engine 201, an anti-virus application unit 203, a first storage unit 205, a second storage unit 207, an interface unit 209, and a web server 211.

The interface unit 21, the anti-virus engine 201, the anti-virus application unit 203, the first storage unit 205, the second storage unit 207, and the interface unit 209 of FIG. 2 perform similar functions as components having similar reference numerals to those shown in FIG. 1, and thus their detailed descriptions are omitted. Hereinafter, the smart card-based anti-virus system will be described in terms of functions of the web browser 23, the proxy server 25, the web server 211, and the like.

The web browser 23 may support HTML or other types of documents so that a user may see HTML or other types of documents. The web server 211 may provide a web page (web pages) in response to a request from the web browser 23.

The proxy server 25 may analyze the request from the web browser 23 and may transmit the request to a corresponding web server. In FIG. 2, only a single web server 211 is illustrated, and thus the proxy server 25 may transmit the request from the web browser 23 to the web server 211.

However, a smart card-based anti-virus system according to an exemplary embodiment may further include another web server (not shown) in addition to the web server 211. The additional web server may be provided in the smart card 200, or may be disposed in an alternate device connected to the device 20 via a network, such as the Internet. In this case, the proxy server 25 may determine whether the request from the web browser 23 is directed to the web server 211 or another web server (not shown), and may transmit the request according to the determination result.

According to the present exemplary embodiment, at least one of applications included in the anti-virus application unit 203 may operate on the web server 211. Examples of an operation on the web server 211 may include, for example, an operation of receiving information (e.g., the anti-virus system setting information) from a user on web contents provided by the web server 211, an operation of receiving a command (a command for scanning data), an operation of providing a user interface to the user through web contents, or an operation of notifying the user about an event (e.g., notification about a scanning result) through the web contents.

The anti-virus application unit 203 may operate on the web server 211, or alternatively, may independently operate from the web server 211. That is, the anti-virus application unit 203 may selectively operate on the web server 211. Thus, some of anti-virus applications included in the anti-virus application unit 203 may operate on the web server 211, and other anti-virus applications may operate independently from the web server 211.

According to an exemplary embodiment, a user may access the Internet through the web server 211 and may access files such as internal schedule management files, telephone directory files, and the like. The files such as internal schedule management files, telephone directory files, and the like may be stored in, for example, the second storage unit 207.

Figure 3:
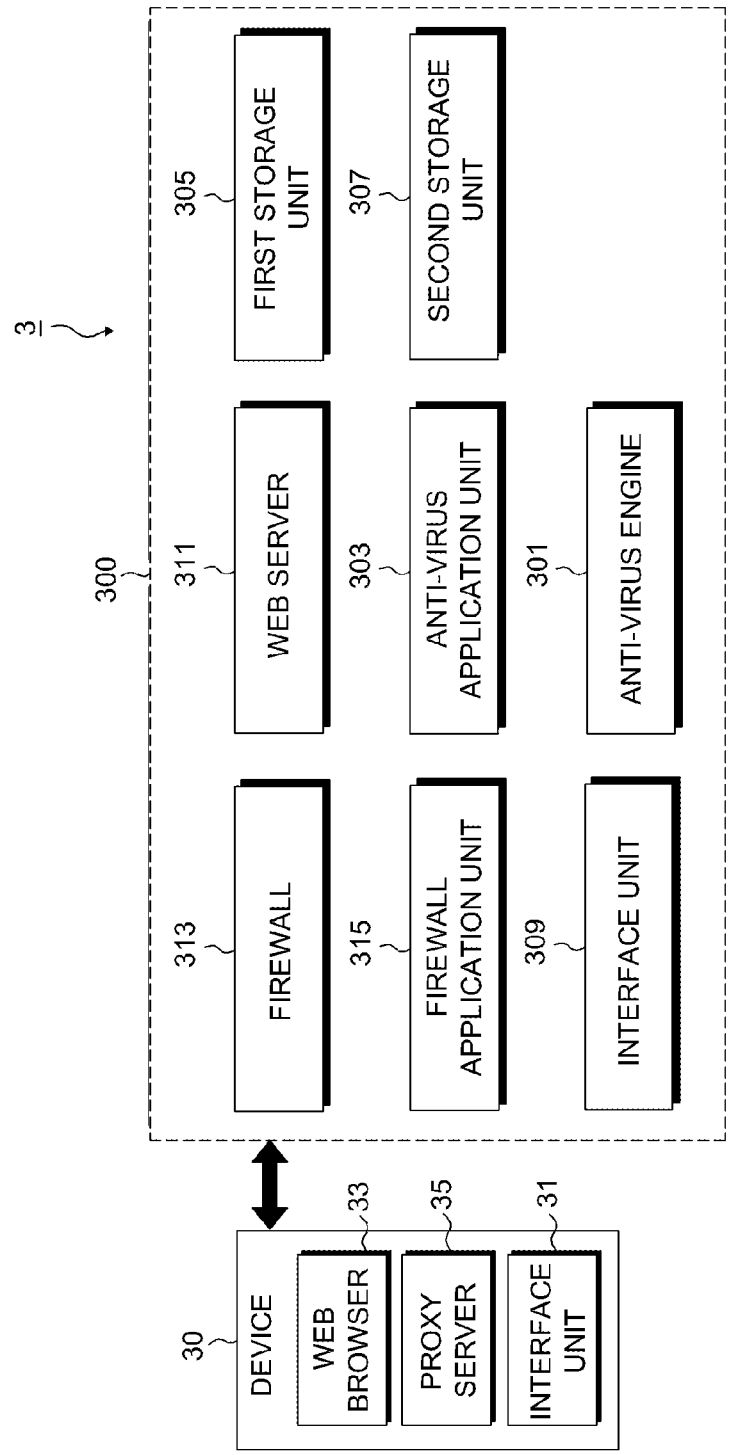
FIG. 3 is a functional block diagram of a smart card-based anti-virus system according to another exemplary embodiment.

FIG. 3 is a functional block diagram of a smart card-based anti-virus system according to another exemplary embodiment.

Referring to FIG. 3, the smart card-based anti-virus system according to the present exemplary embodiment includes a device 30 and a smart card 300. According to the present exemplary embodiment, the device 30 includes an interface unit 31, a web browser 33, and a proxy server 35. The smart card 300 includes an anti-virus engine 301, an anti-virus application unit 303, a first storage unit 305, a second storage unit 307, an interface unit 309, a web server 311, a firewall 313, and a firewall application unit 315.

The interface unit 31, the web browser 33, the proxy server 35, the anti-virus engine 301, the anti-virus application unit 303, the first storage unit 305, and the second storage unit 307 of FIG. 3 perform similar functions as components having similar reference numerals to those shown in FIG. 1 or 2, and thus their detailed descriptions are omitted. Hereinafter, the smart card-based anti-virus system will be described in terms of the firewall 313 and the firewall application unit 315.

The firewall 313 may filter a data packet that is transmitted to or received from the smart card 300 according to a predetermined security policy. For example, the firewall 313 may filter a data packet received from the device 30, or a data packet transmitted to the device 30. The firewall 313 may also filter a data packet according to a predetermined security policy when the data packet is directed to another external device (not shown) other than the device 30 or the data packet is received from the external device.

According to an exemplary embodiment, the firewall 313 may filter a data packet that is directed to the web server 311 or is transmitted from the web server 311, according to a predetermined security policy. For example, according to the predetermined security policy, the firewall 313 may prevent a server with a predetermined URL from accessing the smart card 300 or may prevent a predetermined data packet from being transmitted to the web server 311.

According to an exemplary embodiment, the smart card 300 may further include the firewall application unit 315 for performing an operation required for an operation of the firewall 313. The firewall application unit 315 may include an application that provides a user interface for receiving setting information (firewall setting information) required for an operation of the firewall 313 from a user through the device 30 and/or an application for recording a log about an operation of the firewall 313 and a result of the operation. The firewall application unit 315 may be embodied to operate on the web server 311, or alternatively, may not be embodied to operate on the web server 311.

The firewall setting information may be, for example, information about a list of a server with a predetermined URL for the blocking, an update schedule about the list, or the like. This information is exemplary, and thus any information may be the firewall setting information as long as the information is required for the operation of the firewall 313.

According to an exemplary embodiment, the result of the operation of the firewall 313 may be provided to the device 30. For example, the firewall 313 may transmit the result of the operation of the firewall 313 to the firewall application unit 315 and the anti-virus application unit 303. Then, the firewall application unit 315 may record the result of the operation of the firewall 313 as a log, and the anti-virus application unit 303 may provide the result of the operation of the firewall 313 to the user.

For example, when the smart card 300 accesses an external update sever in order to update virus signature, the firewall 313 determines whether the smart card 300 may be allowed to access the external update server according to a security policy (for example, the security policy may be included in the firewall setting information.). As a result of the determination, when the smart card 300 is not allowed to access the external update server, the anti-virus application unit 303 notifies the user that the smart card 300 is not allowed to access the external update server, and the firewall application unit 315 records the result of the determination as a log.

As described above, in FIG. 3, the smart card-based anti-virus system includes both the firewall 313 and the web server 311. Alternatively, the smart card-based anti-virus system may not include the web server 311. When the smart card-based anti-virus system does not include the web server 311, the smart card-based anti-virus system may perform the same operation as in FIG. 3, except that web contents are not provided to the device 30.

Figure 4:
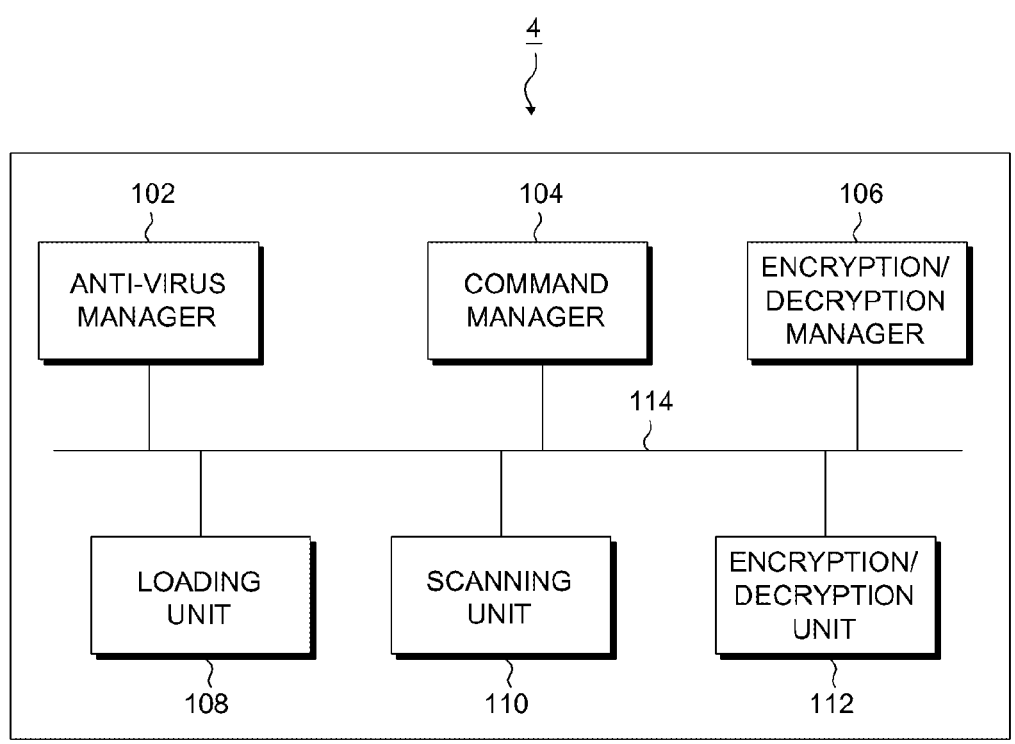
FIG. 4 is a functional block diagram of an anti-virus engine according to an exemplary embodiment.

FIG. 4 is a functional block diagram of an anti-virus engine according to an exemplary embodiment.

Referring to FIG. 4, the anti-virus engine 4 according to the present embodiment includes managers 102, 104, and 106, a loading unit 108, a scanning unit 110, and an encryption/decryption unit 112.

According to an exemplary embodiment, the managers 102, 104, and 106 may analyze a command, and may manage operations of the loading unit 108, the scanning unit 110, and the encryption/decryption unit 112 according to a result of the analysis.

According to an exemplary embodiment, the managers 102, 104, and 106 may include an anti-virus manager 102, a command manager 104, and the encryption/decryption manager 106. In this case, the command manager 104 may analyze a command received by the anti-virus engine, and may determine whether the command is to be managed by the anti-virus manager 102 or the encryption/decryption manager 106. When the command is to be managed by the anti-virus manager 102, the received command is transmitted to the anti-virus manager 102. When the command is to be managed by the encryption/decryption manager 106, the received command is transmitted to the encryption/decryption manager 106.

According to an exemplary embodiment, the managers 102, 104, and 106 may communicate with an interface (I/F) driver included in the device 10, 20 or 30 through an interface unit that supports at least one of a USB protocol, an ISO protocol, and a SD protocol.

An application for providing an anti-virus user interface may be installed on the I/F driver of the device 10, 20 or 30. The application may receive a command, or the like from a user through a user interface, and may transmit the command to the anti-virus manager 102 through the I/F driver.

According to another exemplary embodiment, an anti-virus user interface is not a separate application that is installed on the I/F driver, but instead, the anti-virus user interface may be provided by an anti-virus application included in a smart card, as the above-described exemplary embodiments.

The anti-virus manager 102 may manage operations of the loading unit 108 and the scanning unit 110. For example, when the loading unit 108 or the scanning unit 110 performs a plurality of operations, the anti-virus manager 102 may manage an operation schedule.

The encryption/decryption manager 106 may manage an operation of the encryption/decryption unit 112, and for example, may manage a schedule of an encryption/decryption operation.

The loading unit 108 may perform an operation of loading the virus signature to a memory. The scanning unit 110 may determine whether a virus exists in data to be scanned by comparing the virus signature loaded to the memory with the data to be scanned.

The encryption/decryption unit 112 may decrypt the encrypted virus signature prior to loading the encrypted virus signature to the memory. In addition, the encryption/decryption unit 112 may encrypt and store the virus signature.

In FIG. 4, a reference numeral 114 shows all components are connected to each other. However, it will be understood that only components that are functionally related to each other are connected to each other. According to an exemplary embodiment, the reference numeral 114 may be a bus. In this case, the anti-virus engine includes a controller (not shown) for controlling the bus, and thus only components that are functionally related to each other may communicate with each other.

Figure 5:
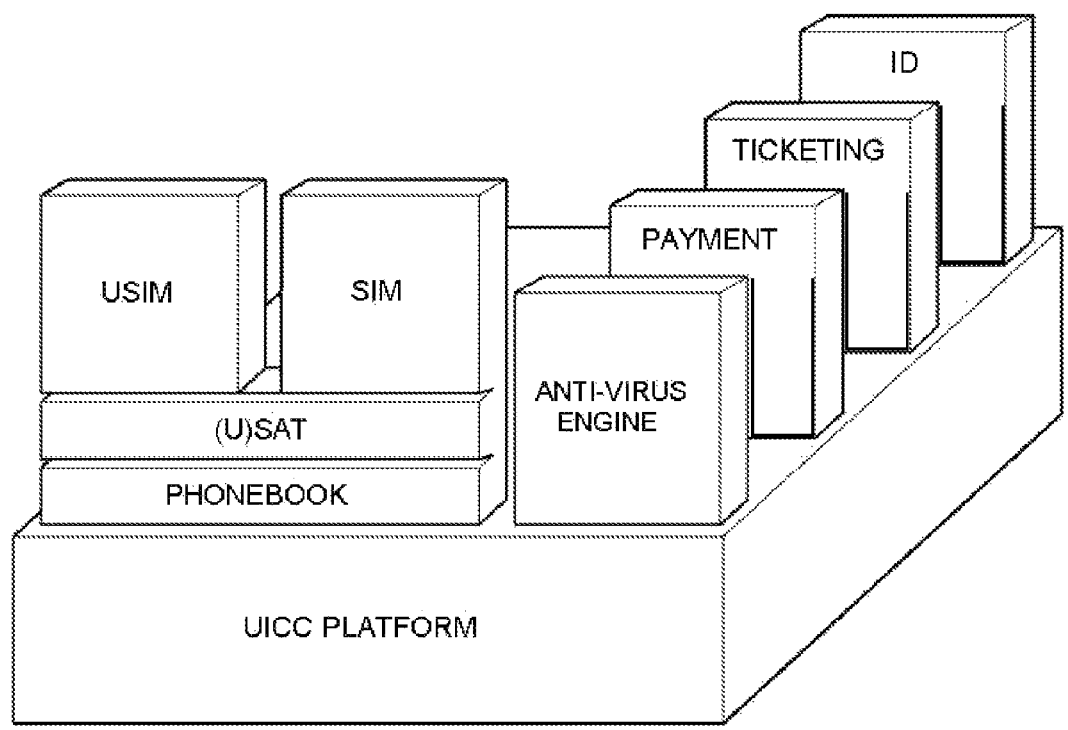
FIG. 5 is a diagram for explaining a case where a smart card-based anti-virus engine is embodied, according to an exemplary embodiment.

FIG. 5 is a diagram for explaining a case where a smart card-based anti-virus engine is embodied, according to an exemplary embodiment.

Referring to FIG. 5, the anti-virus engine may be installed together with applications that operate on a Universal IC Card (UICC) platform.

The applications operating on the UICC platform may perform functions such as payment, ticketing, and/or identification (ID) management. In this case, the UICC is a smart card that is defined according to the 3G standard (TS102221).

The case shown in FIG. 5 is exemplary, and thus the anti-virus engine may be embodied on another platform supporting a smart card, instead of the UICC, without departing from the spirit and scope of the disclosure.

Figure 6:
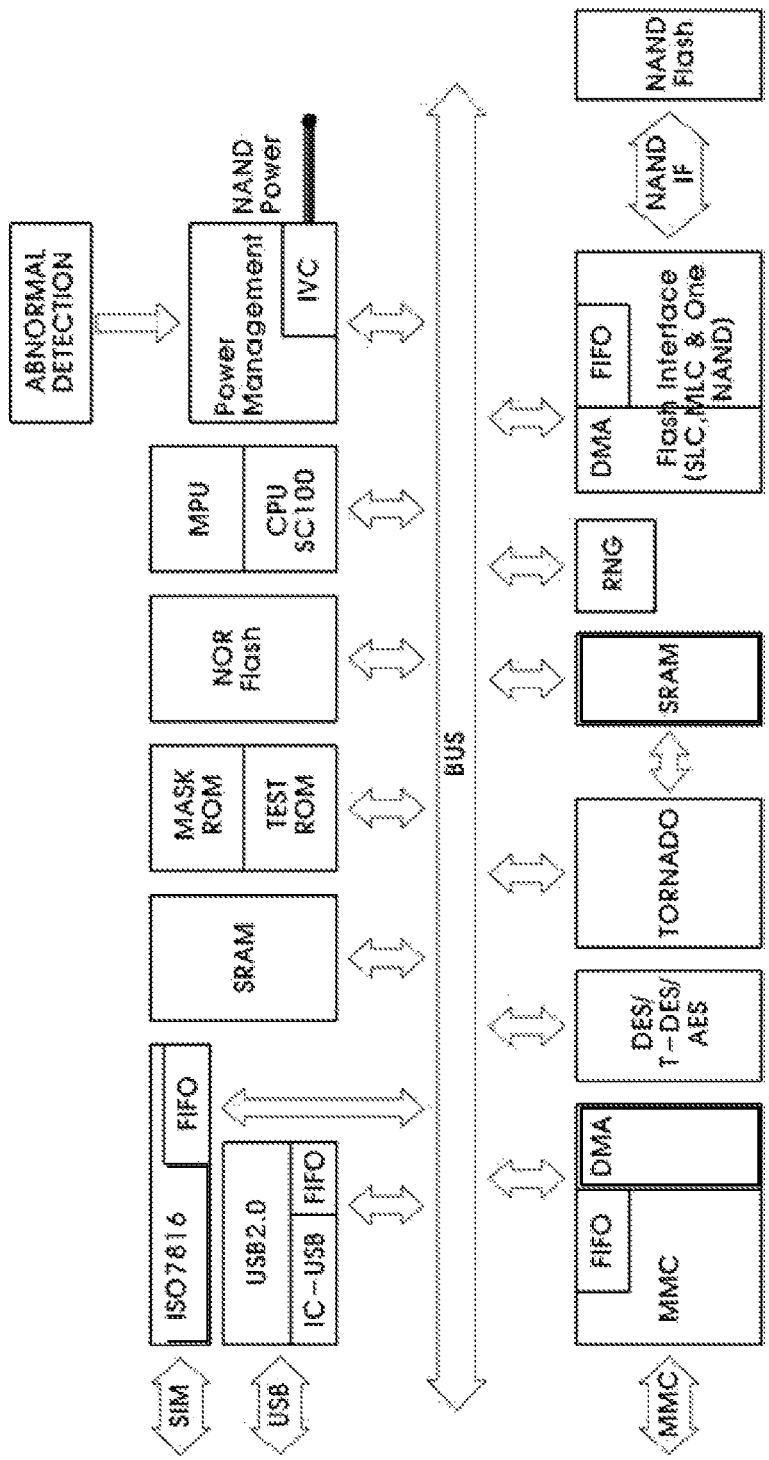
FIG. 6 is a diagram for explaining a smart card board in which a smart card-based anti-virus system is embodied, according to an exemplary embodiment.

FIG. 6 is a diagram for explaining a smart card board in which a smart card-based anti-virus system is embodied, according to an exemplary embodiment.

Referring to FIG. 6, the smart card board according to the present exemplary embodiment may include an interface unit, components (ISO7816, USB2.0, MMC, DMA Controller, and the like) required for the interface unit, a random access memory (RAM), a read only memory (ROM), a flash memory, a central processing unit (CPU), and the like.

According to the present exemplary embodiment, a NOR Flash memory corresponds to each of the first storage units 105, 205, and 305 according to the above-described embodiments, a NAND Flash memory corresponds to each of the second storage unit 107, 207, and 307 according to the above-described embodiments, and the ISO7816, USB2.0, and the like may correspond to an interface unit that supports communication between a device and a smart card.

The anti-virus engine may be loaded to a memory such as a static random access memory (SRAM), and may be executed by the CPU. The anti-virus engine may be loaded to the memory may load virus signature stored in the NAND Flash memory to the SRAM (when the virus signature is encrypted, the virus signature is decrypted prior to loading the virus signature to the SRAM, and a decrypted file is temporally stored in the NAND Flash and is loaded to the SRAM).

Referring to FIG. 6, an anti-virus engine, a firewall, an anti-virus engine application, a firewall application, and the like may be masked and stored in a MASK ROM, or may be stored in the NOR Flash.

In FIG. 6, TORNADO and DES/T-DES/AES are each an encryption/decryption module that is configured as hardware. An encryption/decryption application that performs an encryption/decryption operation by using the encryption/decryption module may be stored in the MASK ROM or the NOR Flash, as described above. The encryption/decryption application may accumulate data to be encrypted/decrypted using the encryption/decryption module in the SRAM positioned below a bus BUS, and may perform an encryption/decryption operation on the data. According to the present exemplary embodiment, encryption/decryption operation is performed by hardware and/or software (application), but this is exemplary. Thus, the encryption/decryption may be performed by software only.

Components that are loaded to the SRAM of FIG. 6 and are executed by the CPU may be anti-virus applications, a firewall, and a firewall application, in addition to the above-described anti-virus engine.

According to an exemplary embodiment, the file to be scanned, which is received through an interface unit according to a USB protocol, may be temporally stored in the NAND Flash memory, and then, may be loaded to the SRAM in predetermined units and may be used in a scanning operation. Alternatively, the file to be scanned, which is received through the interface unit according to the USB protocol, may be directly loaded to the SRAM, and may be used in the scanning operation, like in the above-described exemplary embodiments.

Figure 7:
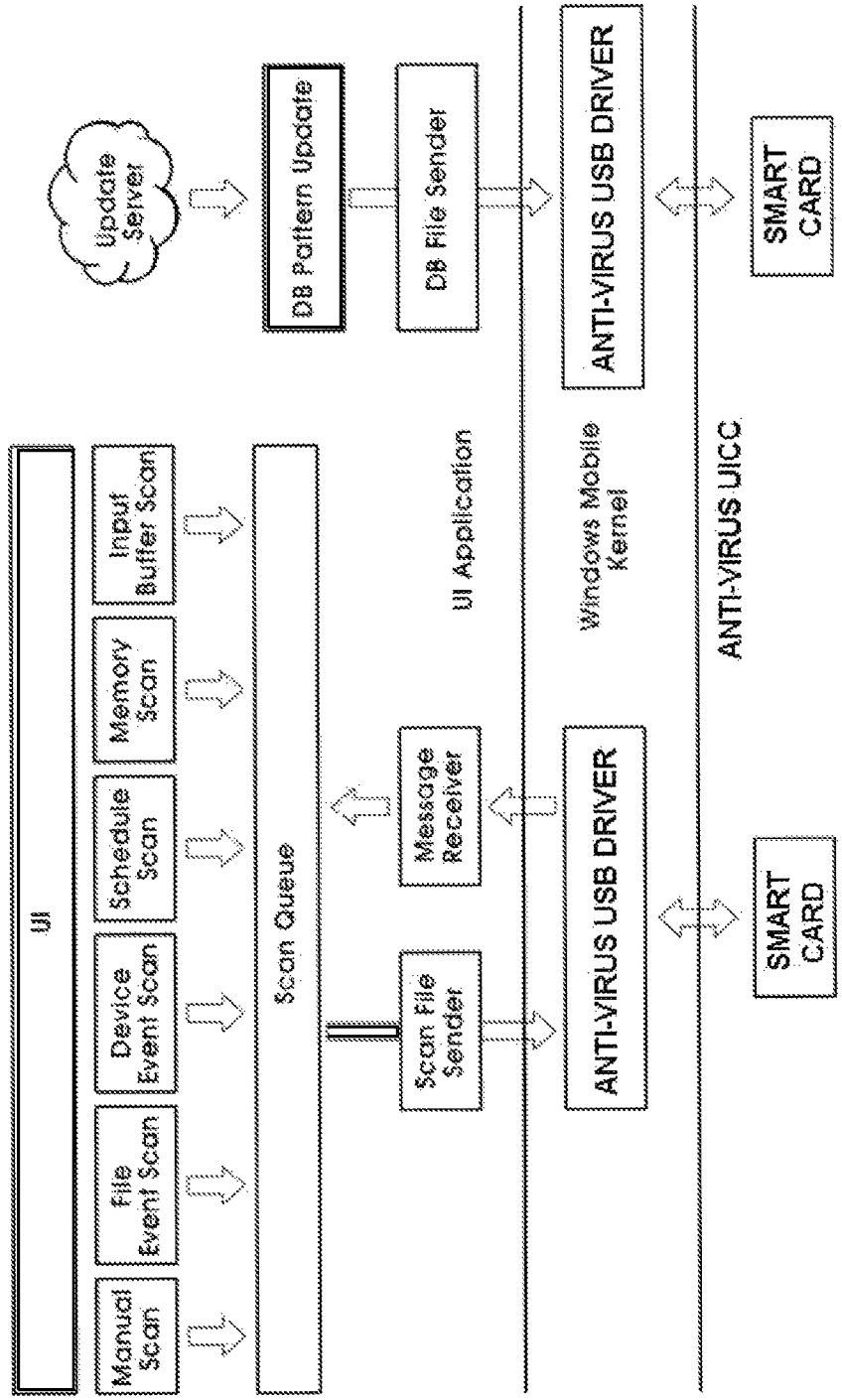
FIG. 7 is a functional block diagram of a device including a smart card mounted thereon, according to an exemplary embodiment.

FIG. 7 is a functional block diagram of a device including a smart card mounted thereon, according to an exemplary embodiment.

Referring to FIG. 7, the device including the smart card mounted thereon includes a user interface (UI) application and Kernel including an anti-virus USB driver.

According to an exemplary embodiment, the UI application may be installed to operate on an anti-virus USB driver of the device. The UI application may be transmitted according to a predetermined rule when data to be scanned is transmitted to the smart card. For example, data to be scanned having a predetermined amount may be transmitted to the smart card.

According to an exemplary embodiment, the UI application includes setting information (e.g., anti-virus system setting information, or firewall setting information) transmitted from a user, or Queue for transmitting the data to be scanned.

According to an exemplary embodiment, the UI application may receive virus signature data to be updated from another server (that is, an update server) connected to the device in order to update virus signature, and may transmit the virus signature data to be updated to the smart card.

The anti-virus USB driver of FIG. 7 is exemplary, but the present exemplary embodiment is not limited thereto. Other drivers such as an ISO driver for supporting an ISO communication protocol, or a SD driver for supporting a SD communication protocol may also be used.

Figure 8:
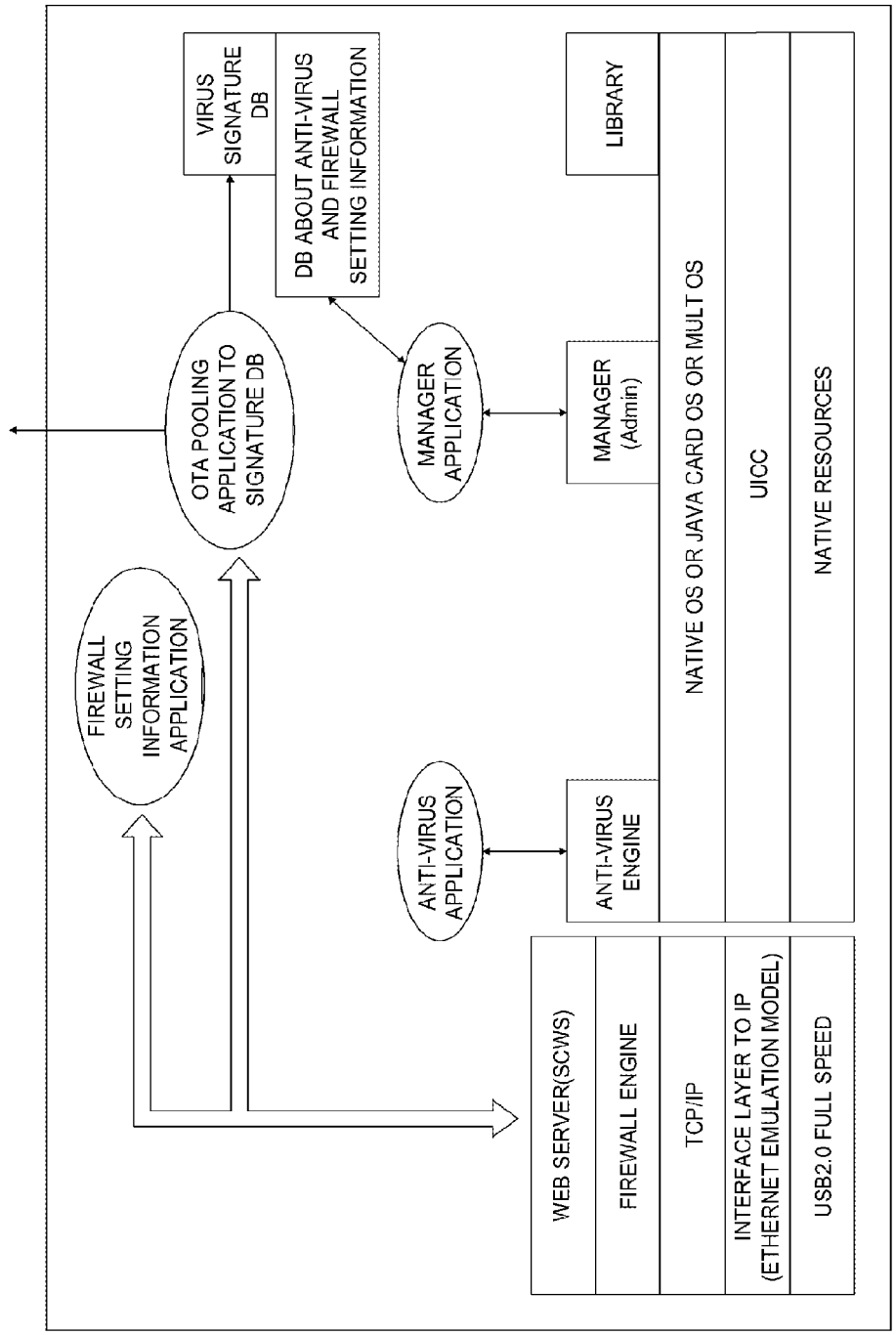
FIG. 8 is a functional block diagram of a smart card according to another exemplary embodiment.

FIG. 8 is a functional block diagram of a smart card according to another exemplary embodiment.

Referring to FIG. 8, the smart card is embodied on a UICC platform, a smart card web server (SCWS) and a firewall are installed on a Transmission Control Protocol/Internet Protocol (TCP/IP) layer, and an anti-virus engine together with applications is installed on an operation system (OS). Databases (DB) for storing virus signature, a DB for storing setting information, and the like are installed to interact with other components. The SCWS performs the same function as the web server according to the above exemplary embodiments, and the anti-virus engine, the firewall, and the DBs have been already described in detail, and thus their detailed description will be omitted.

According to the present exemplary embodiment, the SCWS is configured as an HTTP server when a TCP/IP stack is formed through an interface according to a USB protocol. Alternatively, the SCWS may be configured to operate on an OS, such as a Native OS or a Java Card OS. Regardless of a configuration of the SCWS, the firewall may operate on the TCP/IP stack through the interface according to the USB protocol.

An operation of the firewall may be set through a firewall setting application. For example, the firewall setting application may provide a user interface for inputting the firewall setting information through a device. In this case, the user interface included in web contents may be provided to a user.

A signature OTA pooling application may receive the virus signature through an OTA, and may store the virus signature in a virus signature DB.

A manager application may manage a setting information DB of an anti-virus firewall.

Figure 9:
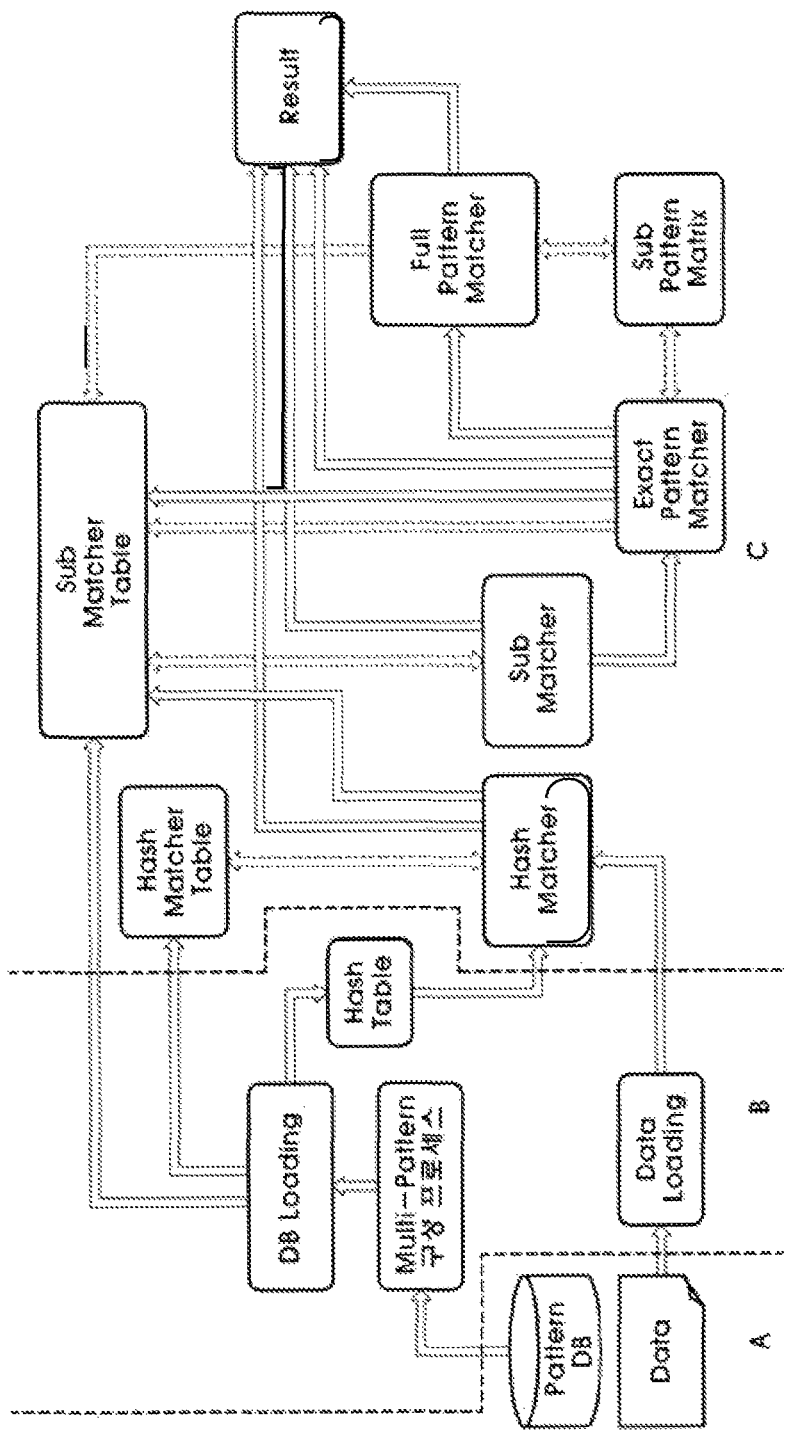
FIG. 9 is a structural diagram of a smart card-based anti-virus engine according to an exemplary embodiment.

FIG. 9 is a structural diagram of a smart card-based anti-virus engine according to an exemplary embodiment.

Referring to FIGS. 4 and 9, a section indicated by 'A' indicates operations of a storage unit for storing virus signature or data to be scanned, a section indicated by 'B' indicates an operation performed in the loading unit 108, and a section indicated by 'C' indicates an operation performed in the scanning unit 110. The smart card-based anti-virus engine of FIG. 9 will be described together with the detailed description of FIG. 18 described below.

Figure 10:
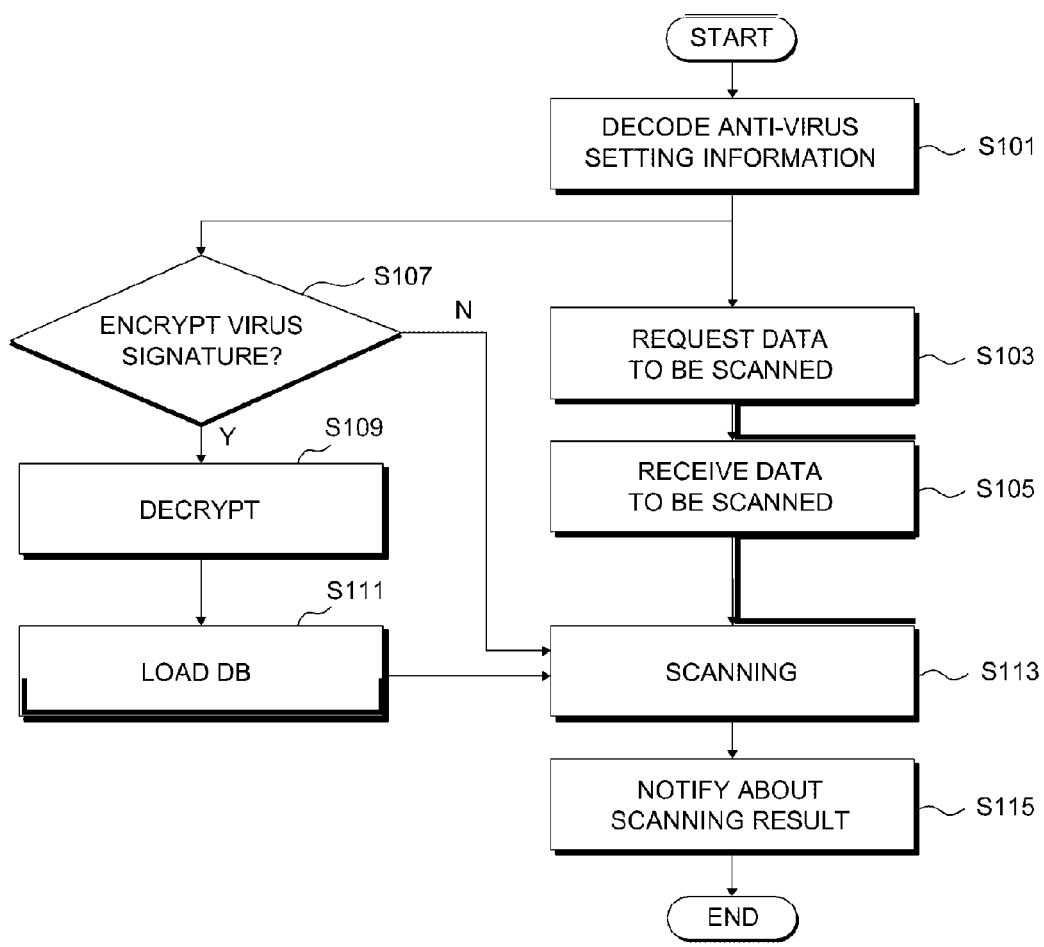
FIG. 10 is a flowchart of a virus scanning method based on a smart card, according to an exemplary embodiment.

FIG. 10 is a flowchart of a virus scanning method based on a smart card, according to an exemplary embodiment.

The virus scanning method based on a smart card will now be described with reference to FIGS. 1 and 10. An anti-virus application decodes anti-virus setting information (S101), and requests the device 10 to transmit data to be scanned (S103). In this case, when the anti-virus application requests the device 10 to transmit data to be scanned, a directory in which the data to be scanned is stored and/or a name of a file to be scanned may be requested. The device 10 may transmit the file to be scanned to the smart card 100 by using the directory and the name of the file, which are contained in the request.

When the virus signature is encrypted (S107: Y), the anti-virus engine 101 decrypts the virus signature (S109), and loads a decrypted signature DB to a memory (S111).

The smart card 100 receives the data to be scanned from the device 10 (S105), compares the data to be scanned with the virus signature, and performs a scanning operation (S113).

Then, the device 10 is notified about a scanning result by an anti-virus application (S115).

According to the above-described exemplary embodiment, Operations S107 and S109 are selectively performed, and thus encryption and decryption may not be performed. In addition, the virus scanning method based on a smart card has been described with reference to FIG. 1. However, other exemplary embodiments (e.g., FIG. 2 or 3) may be used in the virus scanning method.

Figure 11:
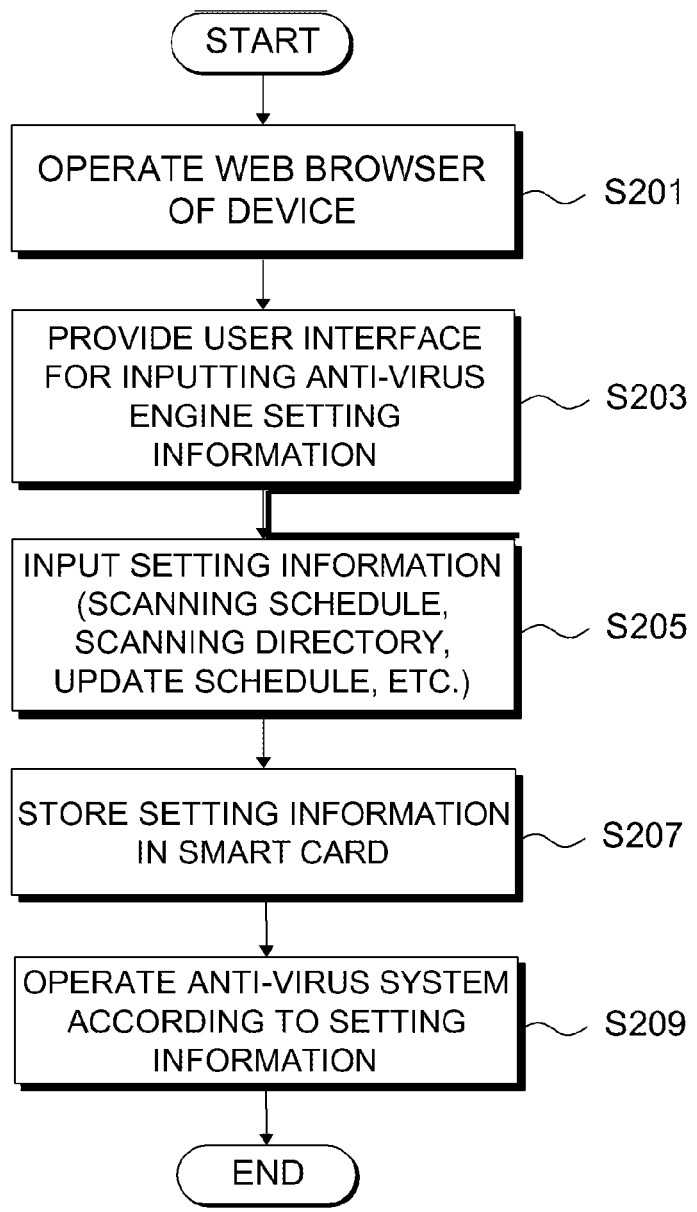
FIG. 11 is a flowchart of an operation of setting an anti-virus system in a virus scanning method based on a smart card, according to an exemplary embodiment.

FIG. 11 is a flowchart of an operation of setting an anti-virus system in a virus scanning method based on a smart card, according to an exemplary embodiment.

The virus scanning method based on a smart card will now be described with reference to FIGS. 11 and 2. When a web browser of a device is executed (S201), an anti-virus application may provide a user interface for inputting anti-virus system setting information through the device 20 (S203). For example, the user interface may be included in web contents.

When setting information (a scanning schedule, a scanning directory, an update schedule, or the like) is received from a user through an input device connected to the device 20 (S205), the anti-virus application stores the input setting information in the smart card 200 (S207). For example, the setting information may be stored in the first storage unit 205.

Then an anti-virus system may operate according to the setting information (S209).

As described above, the virus scanning method based on a smart card has been described with reference to FIG. 2. However, other exemplary embodiments (e.g., FIG. 3) may be used in the virus scanning method.

Figure 12:
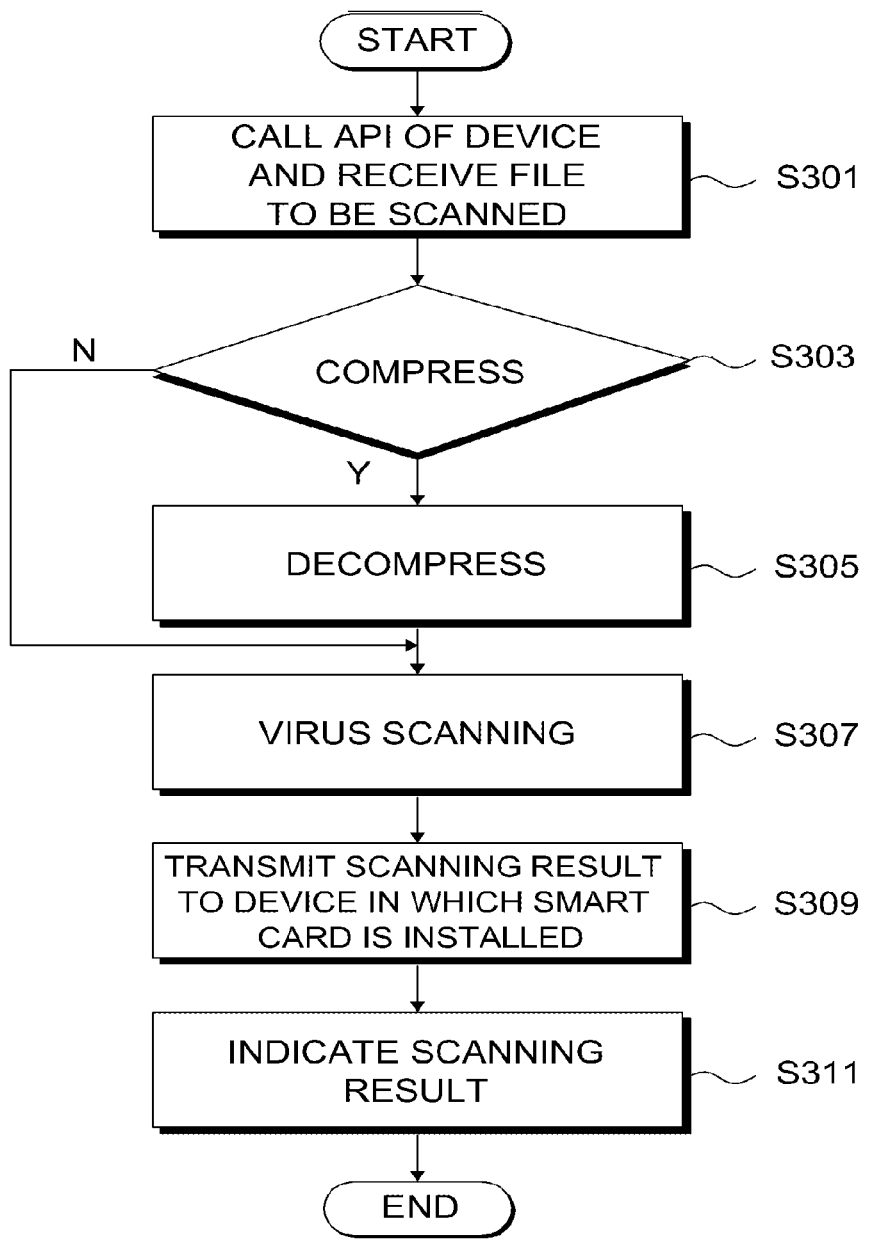
FIG. 12 is a flowchart of a virus scanning method based on a smart card, according to another exemplary embodiment.

FIG. 12 is a flowchart of a virus scanning method based on a smart card, according to another exemplary embodiment.

The virus scanning method based on a smart card will now be described with reference to FIGS. 1 and 12. The smart card 100 calls an application program interface (API) of the device 10 and receives a file to be scanned (S301). When the file to be scanned is compressed (S303: Y), the file to be scanned may be decompressed (S305). Then, the anti-virus engine 101 loads the file to be scanned to a memory, and the file to be scanned and virus signature may be matched with each other (S307).

Then, a scanning result is transmitted to the device 10 (S309), and the device 10 may indicate the scanning result to a user (S311).

As described above, the virus scanning method based on a smart card has been described with reference to FIG. 1. However, other exemplary embodiments (e.g., FIG. 2 or 3) may be used in the virus scanning method.

Figure 13:
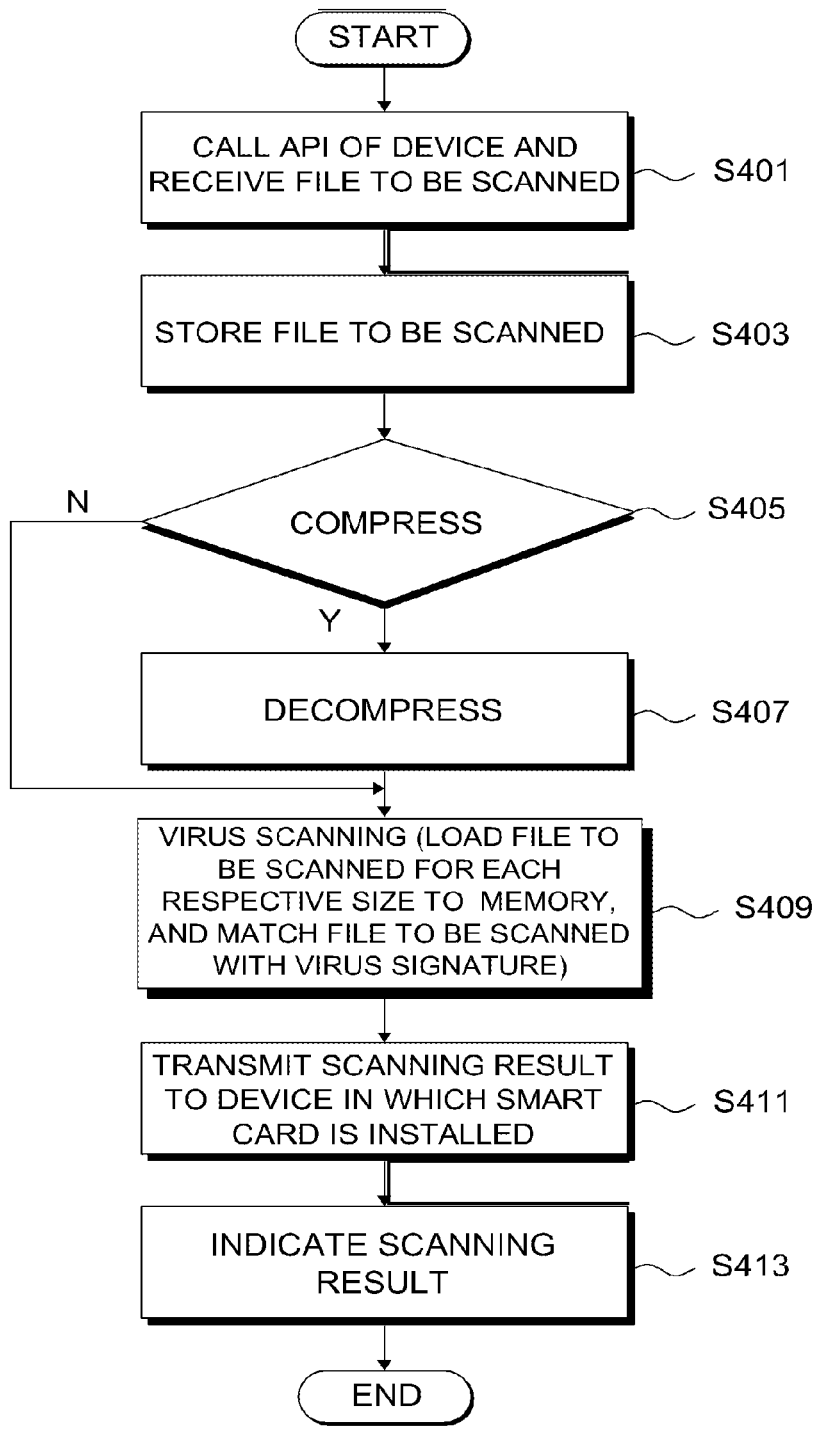
FIG. 13 is a flowchart of a virus scanning method based on a smart card, according to another exemplary embodiment.

FIG. 13 is a flowchart of a virus scanning method based on a smart card, according to another exemplary embodiment.

The virus scanning method based on a smart card will now be described with reference to FIGS. 1 and 13. The smart card 100 calls an API of the device 10 and receives a file to be scanned (S401), and stores the file to be scanned in the second storage unit 107 (S403). Then, when the file to be scanned is compressed (S405: Y) the file to be scanned may be decompressed (S407). Then, the anti-virus engine 101 may load the file to be scanned for each respective size to a memory, and may match the file to be scanned with virus signature (S409).

Then, a scanning result is transmitted to the device 10 by the anti-virus engine 101 (S411), and the device 10 may indicate the scanning result to a user (S413).

As described above, the virus scanning method based on a smart card has been described with reference to FIG. 1. However, other exemplary embodiments (e.g., FIG. 2 or 3) may be used in the virus scanning method.

Figure 14:
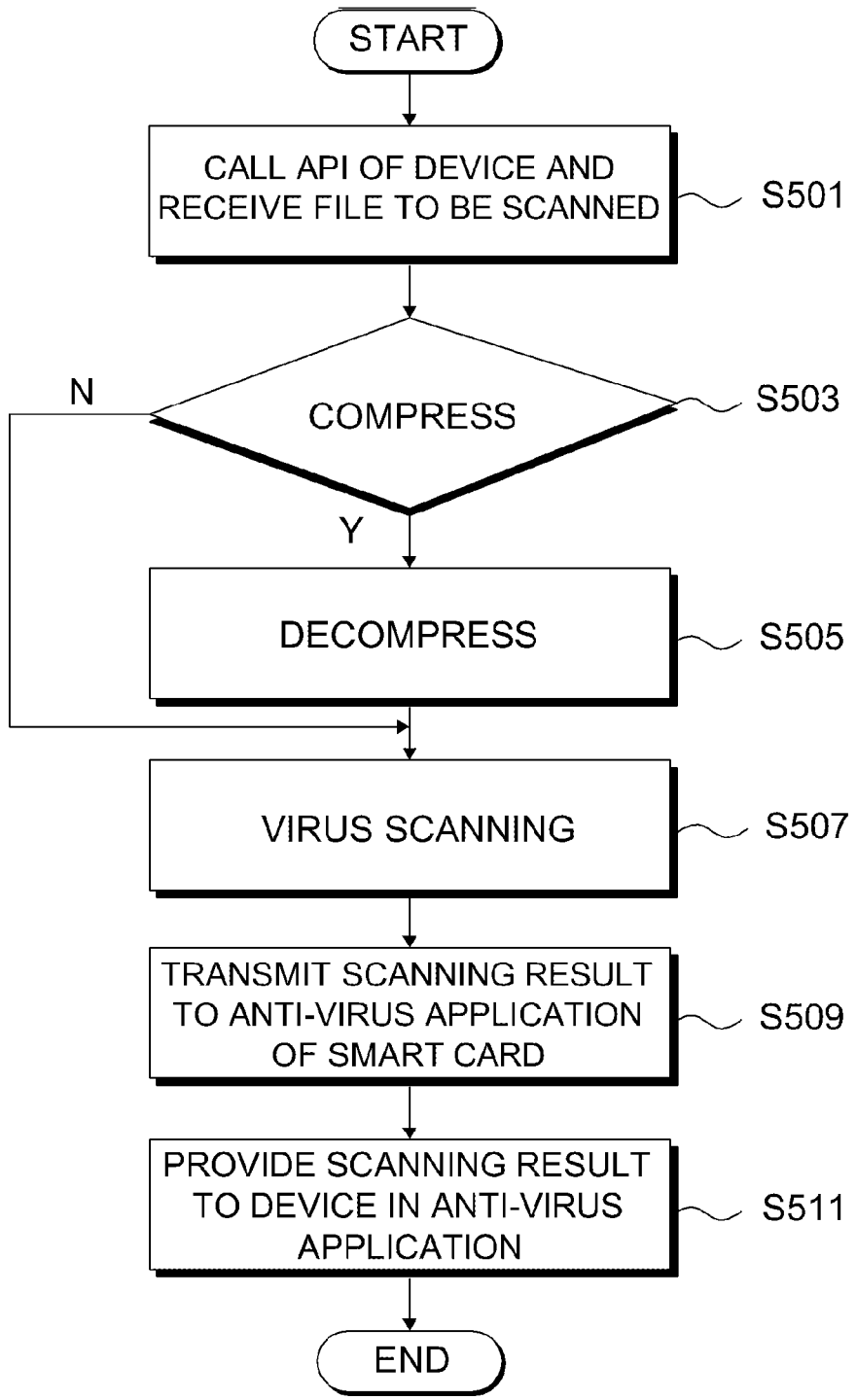
FIG. 14 is a flowchart of a virus scanning method based on a smart card, according to another exemplary embodiment.

FIG. 14 is a flowchart of a virus scanning method based on a smart card, according to another exemplary embodiment.

The virus scanning method based on a smart card will now be described with reference to FIGS. 3 and 14. The smart card 300 calls an API of the device 30 and receives a file to be scanned (S501). When the file to be scanned is compressed (S503: Y), the file to be scanned may be decompressed (S505). Then, the anti-virus engine 301 may match the file to be scanned with virus signature (S507), and transmit the scanning result to an anti-virus application of the smart card (S509).

Then, an anti-virus application transmits a scanning result to the device 30 (S511).

As described above, the virus scanning method based on a smart card has been described with reference to FIG. 3. However, other exemplary embodiments (e.g., FIG. 1 or 2) may be used in the virus scanning method.

Figure 15:
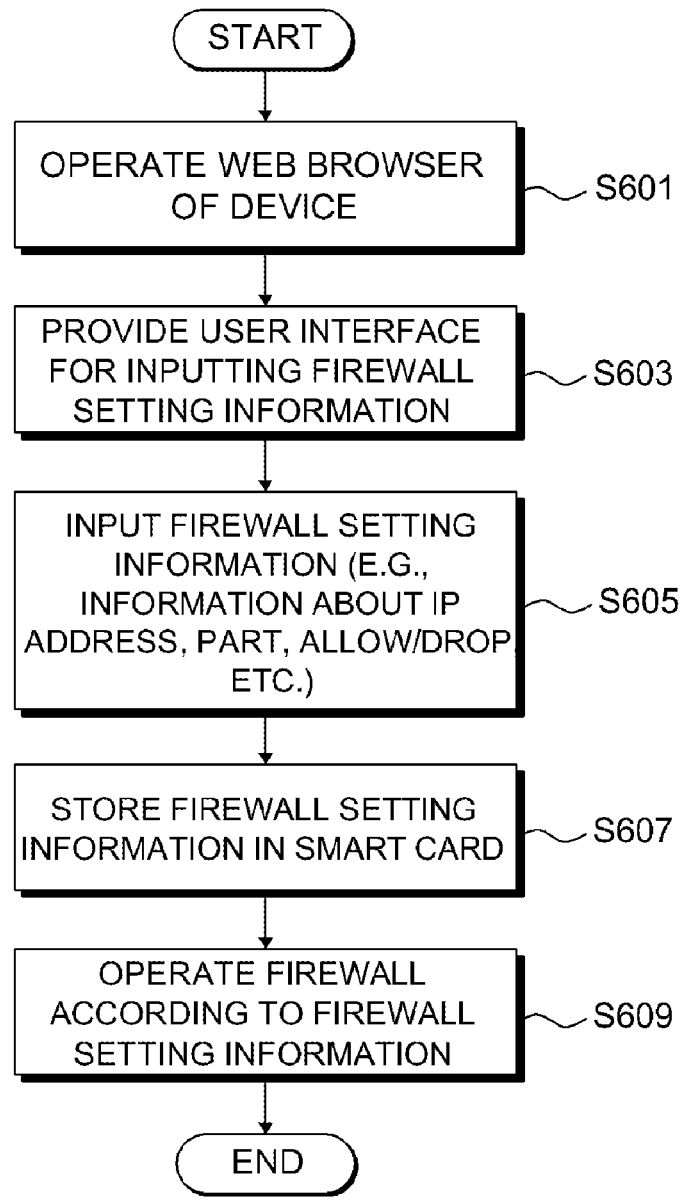
FIG. 15 is a flowchart of an operation of setting a firewall in a virus scanning method based on a smart card, according to another exemplary embodiment.

FIG. 15 is a flowchart of an operation of setting a firewall in a virus scanning method based on a smart card, according to another exemplary embodiment.

The operation of setting the firewall in the virus scanning method based on a smart card will now be described with reference to FIGS. 3 and 15. When the web browser 33 of the device 30 is executed by a user (S601), the firewall application unit 315 may provide a user interface for inputting firewall setting information to the device 30 (S603).

Then, when the firewall setting information (e.g., information about IP address, protocol, port, allow/drop, or the like) is received from a user (S605), the smart card 300 stores the firewall setting information in the first storage unit 305 (S607). A firewall 313 performs a filtering operation by using the firewall setting information stored in the first storage unit 305 (S609).

As described above, the virus scanning method based on a smart card has been described with reference to FIG. 3. However, other exemplary embodiments (e.g., FIG. 1 or 2) may be used in the virus scanning method.

Figure 16:
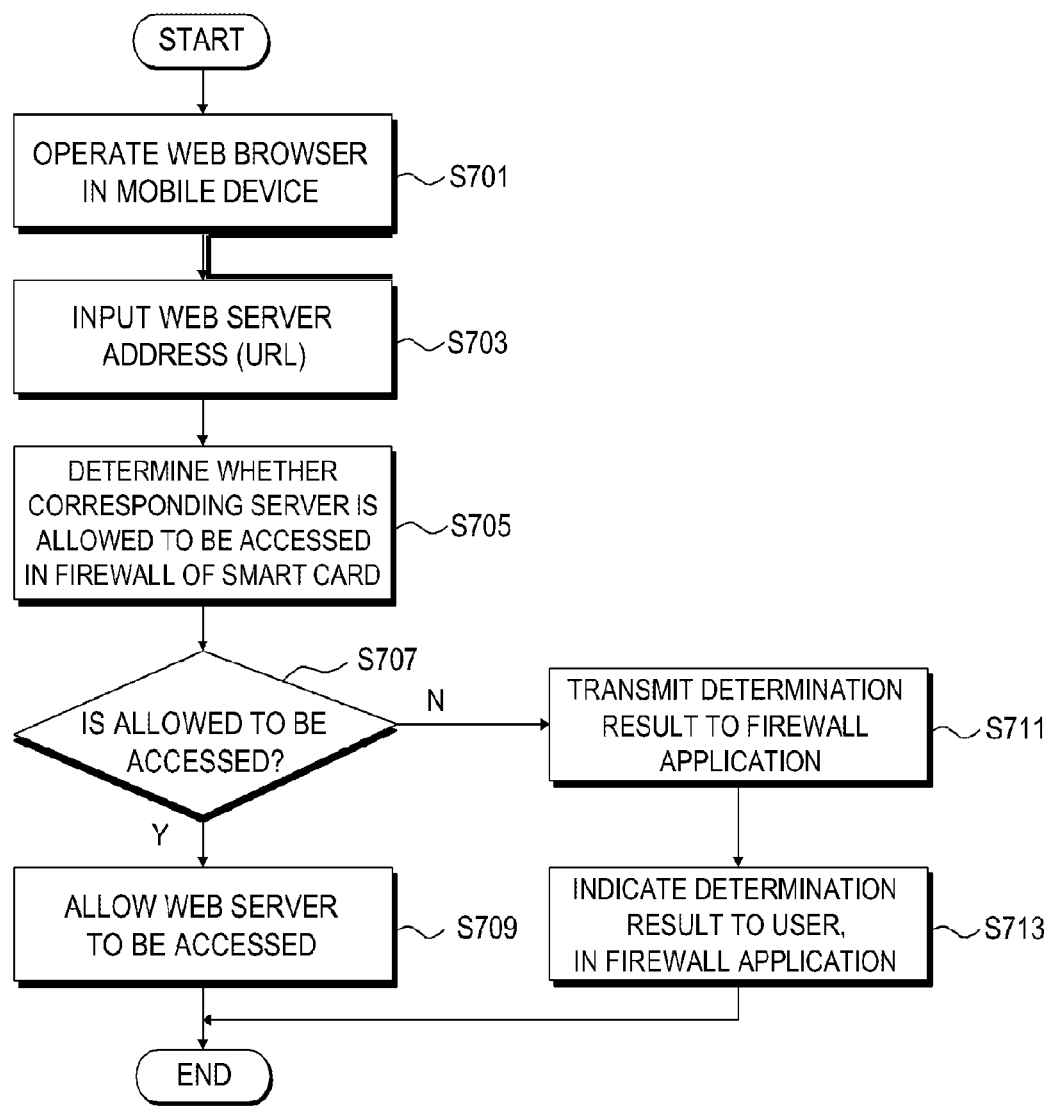
FIG. 16 is a flowchart for explaining an operation of a firewall in a virus scanning method based on a smart card, according to another exemplary embodiment.

FIG. 16 is a flowchart for explaining an operation of a firewall in a virus scanning method based on a smart card, according to another exemplary embodiment.

The operation of the firewall in the virus scanning method will now be described with reference to FIGS. 3 and 16. A web browser is executed in the device 30 (S701). An address (hereinafter, referred to as uniform resource locator (URL)) of a web server may be received from a user (S703). Then, the firewall 313 of the smart card 300 determines whether the web server is allowed to be accessed with reference to the firewall setting information (S705). When the web server is allowed to be accessed (S707: Y), the web server is allowed to be accessed (S709). When the web server is not allowed to be accessed (S707: N), the firewall 313 transmits a determination result to the firewall application unit 315 (S711). Then, the firewall application unit 315 indicates the determination result to the user through the device 30 (S713).

Figure 17:
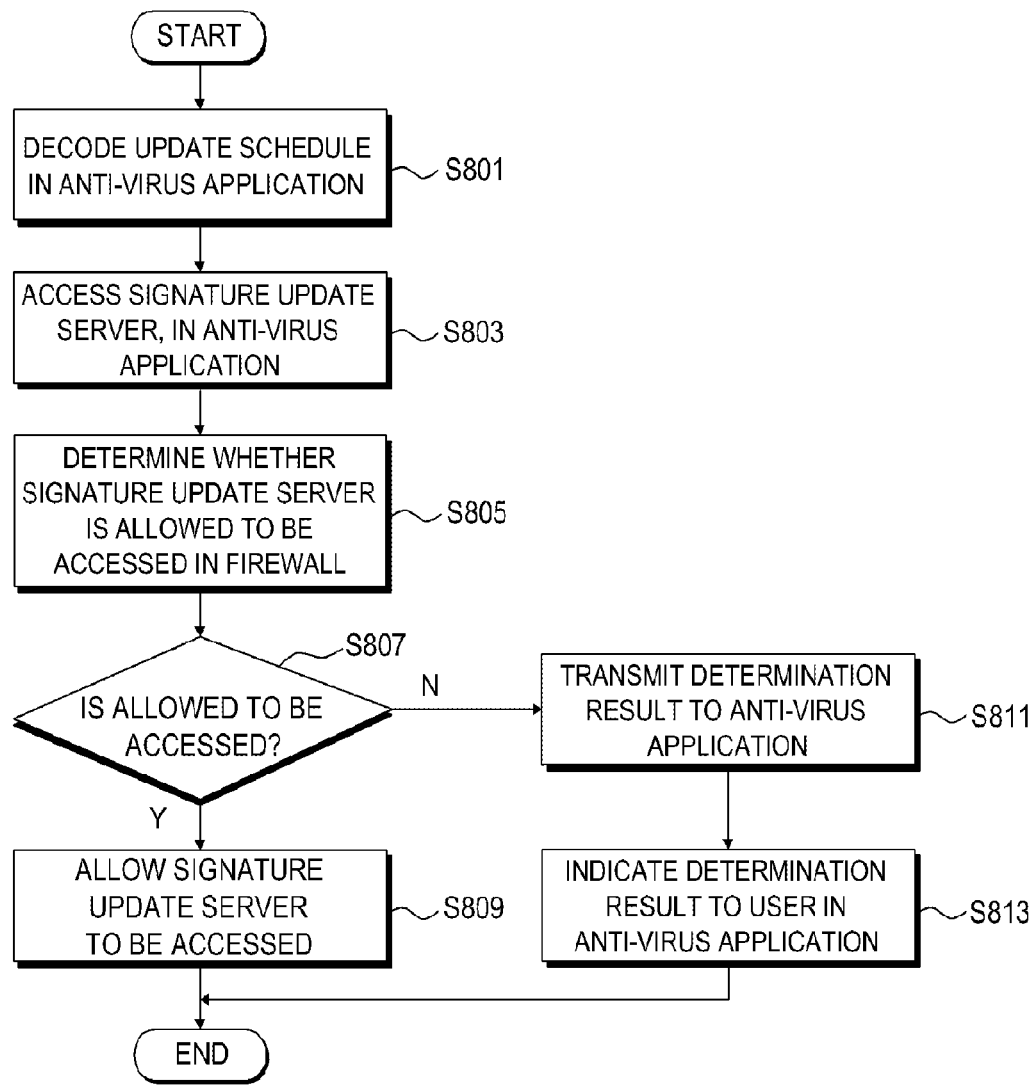
FIG. 17 is a flowchart for explaining an operation of a firewall in a virus scanning method based on a smart card, according to another exemplary embodiment.

FIG. 17 is a flowchart for explaining an operation of a firewall in a virus scanning method based on a smart card, according to another exemplary embodiment.

The operation of the firewall in the virus scanning method will now be described with reference to FIGS. 3 and 17. An anti-virus application decodes an update schedule stored in the first storage unit 305 (S801), and tries to access a signature update server according to the decoded update schedule (S803). For example, in Operation S803, the anti-virus application may provide information about a URL of a signature update server (not shown) to the firewall 313.

The firewall 313 determines whether the signature update server is allowed to be accessed (S805). When the signature update server is allowed to be accessed (S807; Y), the firewall 313 allows the anti-virus application to access the signature update server (S809). When the signature update server is not allowed to be accessed (S807; N), the firewall 313 transmits a determination result to the anti-virus application (S811), and the anti-virus application indicates the determination result to a user (813). The firewall 313 may also transmit the determination result to the firewall application unit 315 in order to leave a log record, and the firewall application unit 315 may record a determination result as a log.

Figure 18:
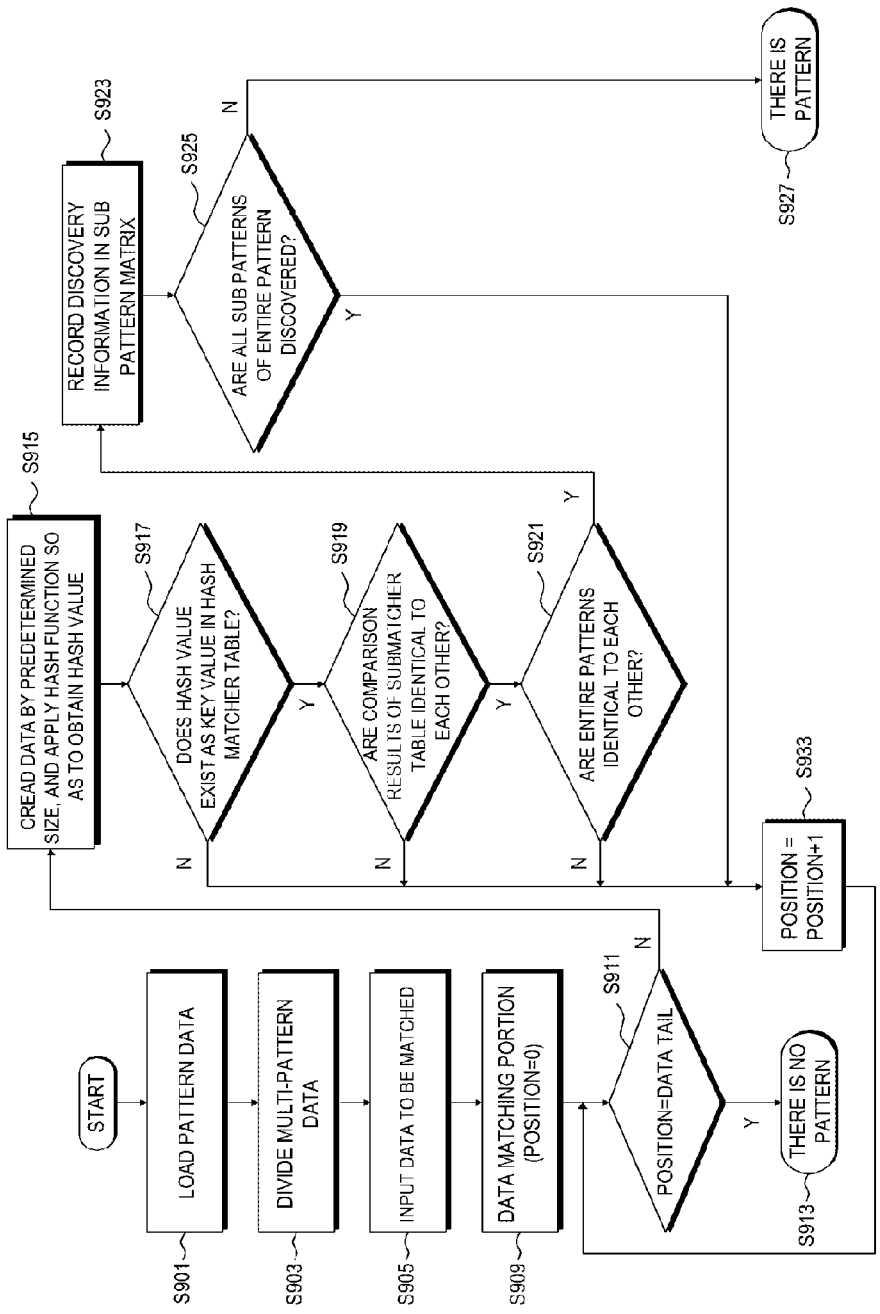
FIG. 18 is a flowchart for explaining a patterning operation in a virus scanning method based on a smart card, according to an exemplary embodiment.
Figure 19:
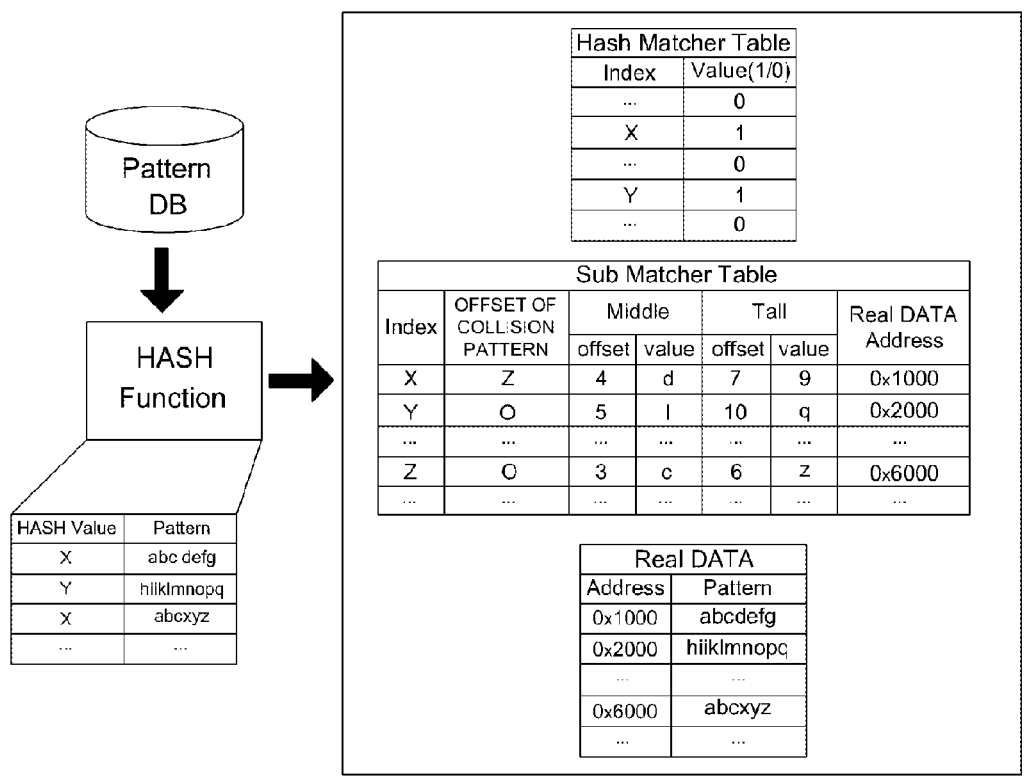
FIG. 19 is a diagram for explaining embodiments of FIGS. 9 and 18.

FIG. 18 is a flowchart for explaining a patterning operation in a virus scanning method based on a smart card, according to an exemplary embodiment. FIG. 19 is a diagram for explaining the exemplary embodiments of FIGS. 9 and 18.

A virus scanning operation in the virus scanning method based on a smart card will now be described with reference to FIGS. 4, 9, and 18. Pattern data is loaded to a memory SRAM (S901). A multi-pattern configuration process divides multi-pattern data from a pattern DB (a virus signature storage unit), and configures the multi-pattern data (S903). A data loading unit inputs data to be matched (data to be scanned) to a Hash Matcher (S905).

Then, a data matching operation is performed from a position '0' to a position 'data tail' (S909). When a current position is the position 'data tail' (S911: Y), it is determined that there is no pattern (that is, there is no matched data) (S913), and thus it is determined that no virus exists in the scanned data.

The above-described operations are performed in the loading unit 108. Operation described below is to be performed in the scanning unit 110.

When the current position is not the position 'data tail' (S911: N), the Hash Matcher reads data from a data position by a predetermined size, and applies a HASH function to the read data so as to obtain a hash value (S915).

When there is no hash value as a key value in a Hash Matcher Table (S917: N) a position value is increased by 1 (S933), and operations after Operation S911 are repeated.

When the Hash Matcher determines whether there is a hash value as a key value in the Hash Matcher Table, and there is the hash value (S917: Y), a Sub Matcher determines whether comparison results of a Submatcher Table are identical. When the comparison results are not identical (S919: N), operations after Operation S933 are repeated.

When comparison results of the Submatcher Table are identical (S919: Y), an Exact Pattern Matcher determines whether an entire portion of a single pattern is identical to that in the comparison results of the Submatcher table. However, when an entire portion of a single pattern is not identical to that (S921: N), operations after Operation S933 are repeated.

When an entire portion of a single pattern is identical to that (S921: Y), the Exact Pattern Matcher records discovery information in a sub pattern matrix (S923). A Full Pattern Matcher determines whether all sub patterns of an entire pattern to be found, which are transmitted through the Exact pattern matcher, are discovered (S925).

When all sub patterns of a single pattern are not discovered (S925: N), operations after Operation S933 are repeated.

When all sub patterns of a single pattern are discovered (S925: Y), it is determined that an entire pattern are identical to that (S927), and it is determined that there is a virus pattern (S927), and thus it is determined that a virus exists in the scanned data. When all sub patterns of a single pattern are not discovered (S925: N), operations after Operation S933 are repeated.

In the above-described operations, the table and DBs of FIG. 19 may be used, but the exemplary embodiment is not limited thereto. The above-described smart card-based anti-virus system may be used in the above-described operation of FIG. 18.

The exemplary embodiments can also be embodied as computer readable codes on a computer readable recording medium. The computer readable recording medium may include may be used alone or in a combination of a program command, a data file, a data structure, and the like. The program command recorded in the computer readable recording medium may be particularly designed or may be well known to one of ordinary skill in the art.

The apparatuses of the exemplary embodiments may include a bus coupled to every unit of the apparatus, at least one processor (e.g., central processing unit, microprocessor, etc.) that is connected to the bus for controlling the operations of the apparatuses to implement the above-described functions and executing commands, and a memory connected to the bus to store the commands, received messages, and generated messages.

According to one or more exemplary embodiments, a smart card, an anti-virus system, and a scanning method may reinforce security of a device.

According to one or more exemplary embodiments, a smart card, an anti-virus system, and a scanning method may reinforce security of a device without substantially using resources of the device.

According to the smart card, the anti-virus system, and the scanning method, a mobile device may be protected from a malicious code, and simultaneously the mobile device itself operates through a large amount capacity of a memory and a processor of the smart card, thereby facilitating an operation of the mobile device in terms of resources.

While the exemplary embodiments have been particularly shown and described, it will be understood by those of ordinary skill in the art that various changes in form and details may be made therein without departing from the spirit and scope of the present invention as defined by the following claims.

What is claimed is:

1. A smart card comprising:
   an interface unit that receives from a device in which the smart card is installed data to be scanned;
   a storage unit that stores a virus signature;
   at least one hardware processor which implements an anti-virus engine that scans the data received by the interface unit and determines whether a virus exists in the scanned data; and
   an application that performs a function of providing, to the device, a user interface for inputting setting information that instructs an operation of the anti-virus engine,
   wherein the setting information is received from a user through the user interface of the device,
   wherein the anti-virus engine comprises a hash matcher, a submatcher, and an exact pattern matcher, and
   wherein the hash matcher reads the data received by the interface unit by a predetermined size and obtains a hash value,
   wherein when the hash matcher determines that the hash value is present as a key value in a hash matcher table, the submatcher determines whether a portion of the read data less than an entire portion of the read data and a portion of the virus signature less than an entire portion of the virus signature stored in the storage unit are identical; and when the portion of the read data and the portion of the virus signature are identical, the exact pattern matcher determines whether the entire portion of the read data and the entire portion of the virus signature are identical.

2. The smart card of claim 1, further comprising a web server.

3. The smart card of claim 1, further comprising a firewall that filters a data packet that is transmitted or received by the smart card according to a security policy.

4. The smart card of claim 1, wherein the application further performs at least one of a function of requesting the device to transmit data to be scanned according to a scanning schedule contained in the setting information, and a function of updating virus signature data that is stored according to an update schedule contained in the setting information.

5. The smart card of claim 4, wherein the user interface comprises an input unit that receives an input of at least one of a scanning schedule of the anti-virus engine, a scanning directory at which a file to be scanned is stored, the file to be scanned, and an update schedule, wherein the input unit is provided to an input device connected to the device.

6. The smart card of claim 1, further comprising a first storage unit that stores the setting information.

7. The smart card of claim 1, further comprising a web server, wherein the application operates on the web server.

8. The smart card of claim 1, wherein the interface unit comprises at least one an International Standardization Organization (ISO) interface unit according to an ISO protocol, a Universal Serial Bus (USB) interface unit according to a USB protocol, and a Secure Digital (SD) interface unit according to an SD protocol.

9. The smart card of claim 1, wherein the anti-virus engine transmits a result of the determining to the device.

10. The smart card of claim 1, further comprising:
a processor;
a memory; and
a first storage unit that stores the anti-virus engine,
wherein the anti-virus engine stored in the first storage unit is loaded to the memory by the processor.

11. The smart card of claim 10, wherein data to be scanned received by the interface unit is loaded to the memory, and
wherein the anti-virus engine determines whether the virus exists in the data to be scanned loaded to the memory.

12. The smart card of claim 10, further comprising a second storage unit that stores data to be scanned received by the interface unit,
wherein the processor loads the data to be scanned stored in the second storage unit, to the memory, and
wherein the anti-virus engine determines whether the virus exists in the data to be scanned loaded to the memory.

13. The smart card of claim 10, wherein the anti-virus engine comprises:
a loading unit that loads the virus signature to be compared with the data to be scanned to the memory; and
a scanning unit that compares the virus signature loaded to the memory with the data to be scanned and determines whether the virus exists based on a result of the comparing.

14. The smart card of claim 1, wherein the anti-virus engine further comprises an encryption and decryption unit that at least one of encrypts the virus signature and decrypts the encrypted virus signature.

15. A smart card-based anti-virus system comprising:
a device having data to be scanned; and
a smart card installed in the device that receives from the device the data to be scanned, scans the received data to be scanned, and determines whether a virus exists in the scanned data, wherein the smart card comprises an anti-virus engine, a storage unit that stores a virus signature, and an application that performs a function of providing, to the device, a user interface for inputting setting information that instructs an operation of the anti-virus engine,
wherein the setting information is received from a user through the user interface of the device,
wherein the anti-virus engine comprises a hash matcher, a submatcher, and an exact pattern matcher, and
wherein the hash matcher reads the data to be scanned received from the device by a predetermined size and obtains a hash value,
wherein when the hash matcher determines that the hash value is present as a key value in a hash matcher table, the submatcher determines whether a portion of the read data less than an entire portion of the read data and a portion of the virus signature less than an entire portion of the virus signature stored in the storage unit are identical; and when the portion of the read data and the portion of the virus signature are identical, the exact pattern matcher determines whether the entire portion of the read data and the entire portion of the virus signature are identical.

16. The smart card-based anti-virus system of claim 15, wherein the smart card comprises a web server.

17. The smart card-based anti-virus system of claim 15, wherein the application further performs at least one of a function of requesting the device to transmit the data to be scanned according to a scanning schedule contained in the setting information and a function of updating virus signature data that is stored in an update schedule contained in the setting information.

18. The smart card-based anti-virus system of claim 17, wherein the user interface includes an input unit that receives an input of at least one of a scanning schedule of the anti-virus engine, a scanning directory at which a file to be scanned is stored, the file to be scanned, and an update schedule, wherein the input unit is provided to an input device connected to the device.

19. The smart card-based anti-virus system of claim 15, wherein the smart card further comprises a web server,
wherein the application operates on the web server.

20. The smart card-based anti-virus system of claim 15, wherein the smart card comprises a firewall that filters a data packet that is transmitted or received by the smart card according to a security policy.

21. The smart card-based anti-virus system of claim 15, wherein the smart card transmits a result of the determining to the device.

22. The smart card-based anti-virus system of claim 15, wherein the virus signature is an encrypted virus signature,
wherein the smart card decrypts the encrypted virus signature stored in the storage unit, compares the decrypted virus signature with the data to be scanned, and determines whether the virus exists based on a result of the comparing.

23. The smart card-based anti-virus system of claim 15, wherein the smart card comprises:
a processor;
a memory; and
a first storage unit that stores the anti-virus engine,
wherein the anti-virus engine stored in the first storage unit is loaded to the memory by the processor, and
wherein the loaded anti-virus engine determines whether the virus exists in the data to be scanned.

24. The smart card-based anti-virus system of claim 15, wherein the smart card comprises an encryption and decryption unit that at least one of decrypts an encrypted virus signature and encrypts the virus signature.

25. A method of scanning data for a virus in an anti-virus scanning mode, the virus scanning method comprising:
providing, to a device in which the smart card is installed, a user interface for inputting setting information that instructs an operation of the anti-virus mode;
receiving, by a smart card, from the device data to be scanned;
receiving, by the smart card, setting information from the device through the user interface, wherein the setting information instructs an operation of the anti-virus scanning mode;
scanning, by the smart card, the received data to be scanned for a virus; and
determining, by the smart card, whether the virus exists in the scanned data based on a result of the scanning,
wherein the scanning further comprises:
reading the data by a predetermined size and obtaining a hash value;
wherein when it is determined that the hash value is present as a key value in a hash matcher table, determining whether a portion of the read data less than an entire portion of the read data and a portion of a virus signature less than an entire portion of the virus signature are identical; and
when the portion of the read data and the portion of the virus signature are identical, determining whether the entire portion of the read data and the entire portion of the virus signature are identical.

26. The virus scanning method of claim 25, further comprising requesting the device to transmit the data to be scanned according to a scanning schedule contained in the setting information.

27. The virus scanning method of claim 25, further comprising providing, through the user interface, a data list to be scanned and receiving an input of a user that selects the data to be scanned from the data list to be scanned,
wherein the determining is performed on the data to be scanned selected by the user in the data list to be scanned.

28. The virus scanning method of claim 25, further comprising providing a result of the determining to a user.

29. The virus scanning method of claim 25, further comprising updating virus signature data, according to an update schedule contained in the setting information.

30. The virus scanning method of claim 25, wherein the smart card comprises a firewall that filters a data packet that is transmitted or received by the smart card according to a security policy.

31. The virus scanning method of claim 30, wherein, when the virus signature is received from an external server, the firewall determines whether an external server is allowed to be accessed, and receives the virus signature from the external server when the external server is allowed to be accessed.

32. The virus scanning method of claim 25, wherein the smart card comprises:
a processor;
a memory;
a first storage unit that stores an anti-virus engine; and
an application that performs a function of providing the user interface for inputting the setting information,
wherein the anti-virus engine stored in the first storage unit is loaded to the memory by the processor, and
wherein the loaded anti-virus engine determines whether the virus exists in the data to be scanned.

33. The virus scanning method of claim 32, further comprising loading the data to be scanned received from the device to the memory,
wherein the anti-virus engine determines whether the virus exists in the data to be scanned loaded to the memory.

34. The virus scanning method of claim 32, wherein the smart card further comprises a second storage unit that stores the data to be scanned received from the device,
wherein the processor loads the data to be scanned stored in the second storage unit to the memory, and
wherein the anti-virus engine determines whether the virus exists in the data to be scanned loaded to the memory.

35. The virus scanning method of claim 32, wherein the anti-virus engine comprises:
a loading unit that loads the virus signature to be compared with the data to be scanned to the memory; and
a scanning unit that compares the virus signature loaded to the memory with the data to be scanned and determines whether virus exists in the scanned data based on a result of the comparing.

36. The virus scanning method of claim 35, wherein the anti-virus engine further comprises an encryption and decryption unit that at least one of encrypts a virus signature and decrypts an encrypted virus signature.

37. A smart card comprising:
at least one hardware processor implementing an anti-virus engine that compares data to be scanned, received from a device in which the smart card is installed, to a virus signature and determines whether virus exists in the scanned data based on a result of the comparing;
a first anti-virus application that updates the virus signature; and
a second anti-virus application that performs a function of providing, to the device, a user interface for inputting setting information that instructs an operation of the anti-virus engine,
wherein the setting information is received from a user through the user interface of the device, and
wherein the anti-virus engine comprises a hash matcher, a submatcher, and an exact pattern matcher, and
wherein the hash matcher reads the data by a predetermined size and obtains a hash value;
wherein when the hash matcher determines that the hash value is present as a key value in a hash matcher table, the submatcher determines whether a portion of the read data less than an entire portion of the read data and a portion of the virus signature less than an entire portion of the virus signature are identical; and when the portion of the read data and the portion of the virus signature are identical, the exact pattern matcher determines whether the entire portion of the read data and the entire portion of the virus signature are identical.

38. The smart card of claim 37, further comprising a storage unit that stores the virus signature.

39. The smart card of claim 37, further comprising a third anti-virus application that requests the device to transmit the data to be scanned.

40. The smart card of claim 37, further comprising:
a storage unit; and
a fourth anti-virus application that stores the data to be scanned transmitted from the device in the storage unit.

41. The smart card of claim 37, wherein the first anti-virus application receives data to be updated by using an over-the-air (OTA) method.

42. The smart card of claim 37, wherein the first anti-virus application receives data to be updated from a server that manages the data to be updated according to a HTTP protocol.

43. The smart card of claim 1, wherein the anti-virus engine is implemented at least in part as a hardware circuit.

44. The smart card of claim 1, wherein the anti-virus engine is implemented at least in part by software running on the at least one hardware processor.

\* \* \* \* \*